(12) United States Patent
Sakai et al.

(10) Patent No.: US 7,673,015 B2
(45) Date of Patent: Mar. 2, 2010

(54) INFORMATION-PROCESSING APPARATUS, INFORMATION-PROCESSING METHODS, RECORDING MEDIUMS, AND PROGRAMS

(75) Inventors: Yusuke Sakai, Kanagawa (JP); Mikio Kamada, Kanagawa (JP); Naoki Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 981 days.

(21) Appl. No.: 11/188,837

(22) Filed: Jul. 26, 2005

(65) Prior Publication Data

US 2006/0031682 A1 Feb. 9, 2006

(30) Foreign Application Priority Data

Aug. 6, 2004 (JP) ............................. 2004-230259

(51) Int. Cl.
G06F 15/16 (2006.01)
(52) U.S. Cl. ..................... 709/217; 709/231; 709/238
(58) Field of Classification Search ................ 709/217, 709/231, 238
See application file for complete search history.

(56) References Cited

U.S. PATENT DOCUMENTS 6,166,729 A * 12/2000 Acosta et al. ............... 709/219
7,404,001 B2 * 7/2008 Campbell et al. ........... 709/231
2007/0186002 A1 * 8/2007 Campbell et al. ........... 709/231

OTHER PUBLICATIONS

U.S. Appl. No. 11/133,656, Unknown.
U.S. Appl. No. 11/177,444, filed Jul. 11, 2005, Sakai et al.
U.S. Appl. No. 11/179,560, filed Jul. 13, 2005, Sakai et al.
U.S. Appl. No. 11/188,698, filed Jul. 26, 2005, Saito et al.
U.S. Appl. No. 11/572,593, filed Jan. 24, 2007, Saito, et al.
U.S. Appl. No. 11/658,476, filed Jan. 25, 2007, Saito, et al.
U.S. Appl. No. 11/572,597, filed Jan. 24, 2007, Sakai, et al.
U.S. Appl. No. 11/658,833, filed Jan. 29, 2007, Saito, et al.

* cited by examiner

Primary Examiner—Phuoc Nguyen
(74) Attorney, Agent, or Firm—Oblon, Spivak, McClelland, Maier & Neustadt, L.L.P.

(57) ABSTRACT

An information-processing apparatus operated by a user to carry out communications through a network transmits user-disclosure information to an other information-processing apparatus. The user-disclosure information includes a number of other users utilizing the information-processing apparatus. The apparatus also receives user-disclosure information for the other apparatus and controls a process to display the other user-disclosure information. The apparatus produces a determination result indicating that a requested connection to the other information-processing apparatus is authorized or not authorized by the other information-processing apparatus based on a response received from the other information-processing apparatus. The response is based on the transmitted user-disclosure information. The apparatus is also configured to transmit image and voice data to the other information-processing apparatus and receive image and voice data from the other information-processing apparatus in case the determination result indicates that a connection with the other information-processing apparatus is authorized by the other information-processing apparatus.

20 Claims, 16 Drawing Sheets

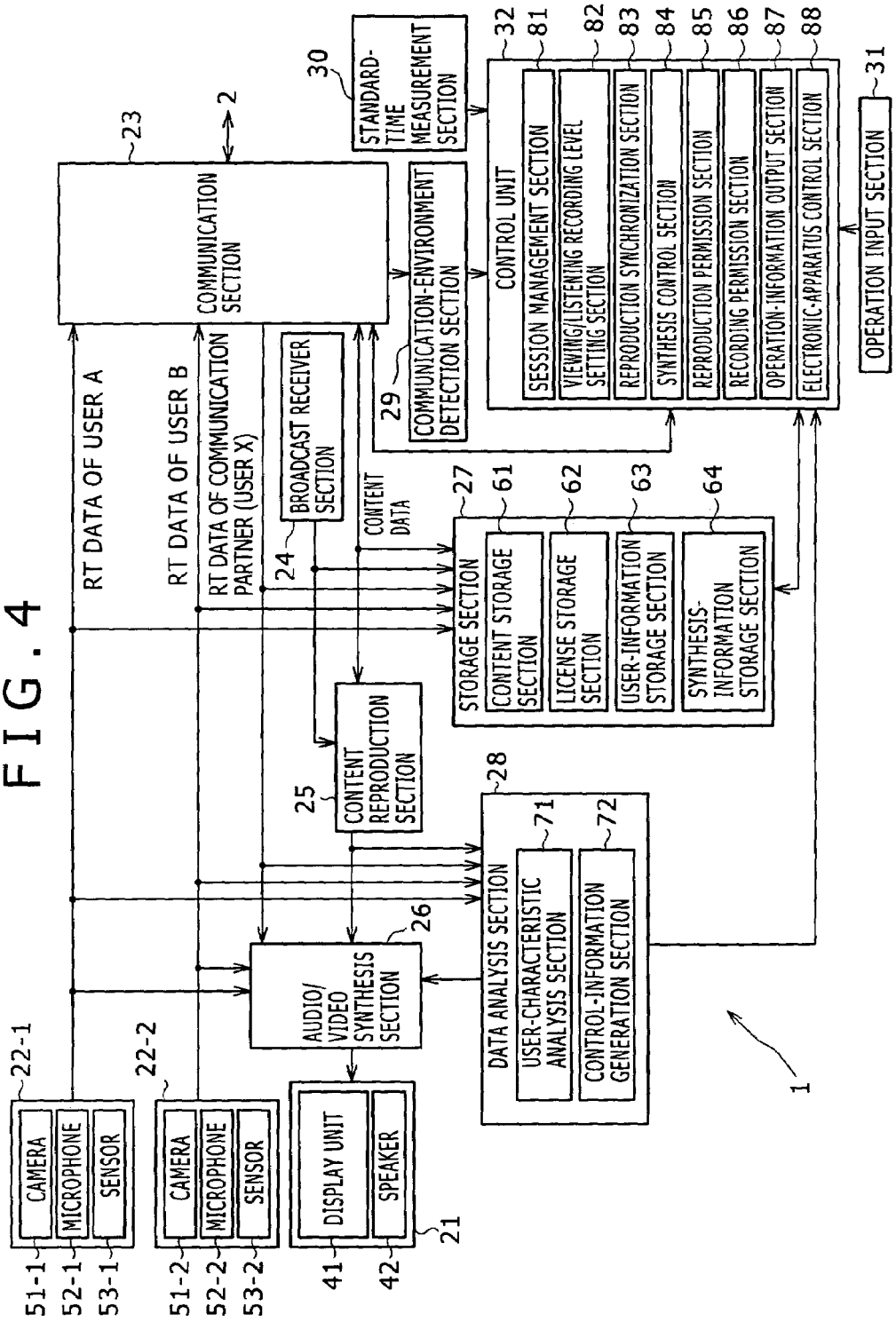

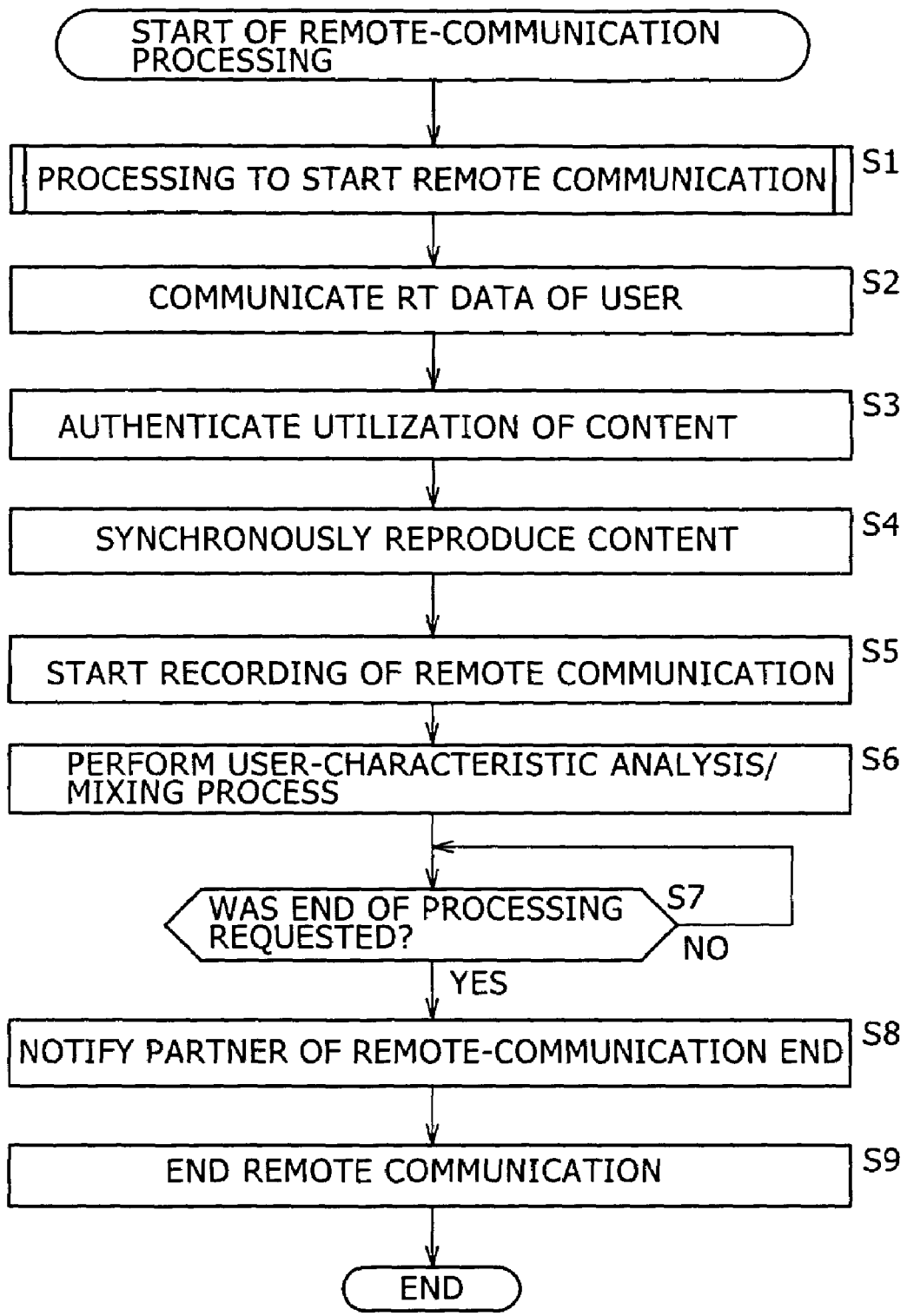

FIG. 7

| USER NAME | ATTRIBUTE | PRIVATE LABEL | CONTACT ADDRESS |
|---|---|---|---|
| USER X | FAMILY | 1 | 050***** |
| USER Y | FAMILY | 2 | 001-1*** |
| USER Z | FRIEND | 4 | abc@de.fg |
| GROUP 1 | UNIVERSITY | 5 | Member.** |
| GROUP 2 | HOBBY | 3 | *** |
| ... | ... | ... | ... |
| ... | ... | ... | ... |

FIG. 8

| USER NAME | USER A |
|---|---|
| UTILIZATION STATUS | ON |
| CONTENT NAME | CS121ch |
| ATTRIBUTE | FAMILY |
| PRIVATE LEVEL | AT LEAST 2 |
| DISCLOSURE LEVEL | AT LEAST 1 |
| . . . | . . . |
| . . . | . . . |

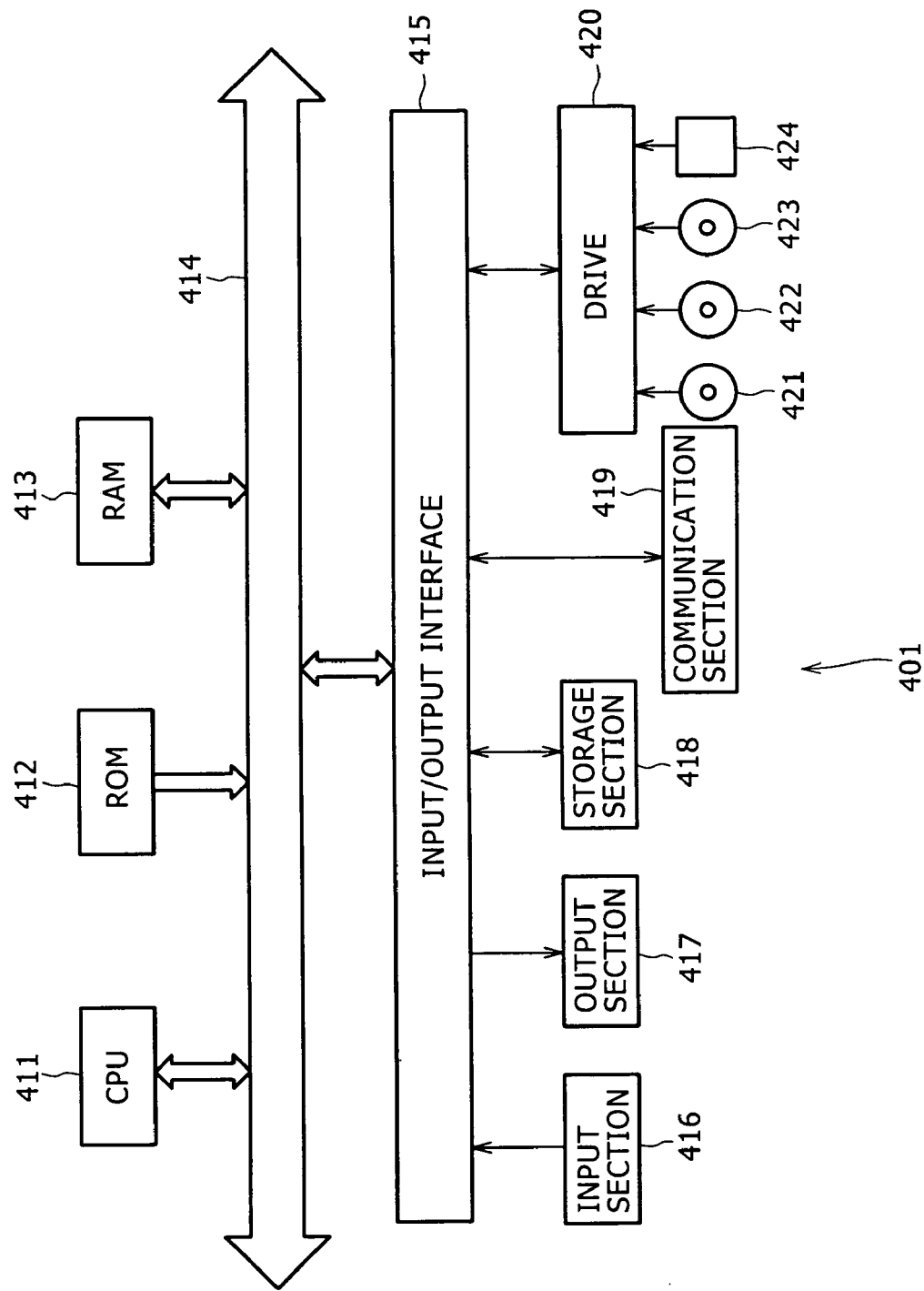

INFORMATION-PROCESSING APPARATUS, INFORMATION-PROCESSING METHODS, RECORDING MEDIUMS, AND PROGRAMS

CROSS REFERENCES TO RELATED APPLICATIONS

The present invention contains subject matter related to Japanese Patent Application JP 2004-230259 filed in the Japanese Patent Office on Aug. 6, 2004, the entire contents of which being incorporated herein by reference.

BACKGROUND OF THE INVENTION

The present invention relates to information-processing apparatus, information-processing methods, recording medium, and programs. More particularly, the present invention relates to information-processing apparatus, information-processing methods, programs, and recording mediums, which are each connected to another information-processing apparatus by a network, used for synthesizing a content common to the apparatus with voices and images of users operating the apparatus and used for reproducing a result of the synthesis synchronously.

The apparatus in related art used in interactions with people at locations remotely separated from each other include the telephone, the so-called TV telephone, and a video conference system. There is also a method whereby personal computers or the like are connected to the Internet and used for chats based on texts and video chats based on images and voices. Such interactions are referred to hereafter as communications.

Such an apparatus in related art uses a telephone number or IP address of another apparatus to be connected to the apparatus in related art to make a request for a start of a remote communication prior to the remote communication. Thus, in spite of the fact that the other apparatus to serve as a communication partner supposed to give a response to the request for a start of a remote communication is capable of recognizing the apparatus making the request, it is difficult to identify the user itself, who operates the apparatus in related art to make the request.

In order to solve the problem, for example, Japanese Patent Laid-open No. 2001-195328 discloses a communication system in which, when a user makes a request for a start of a remote communication with another user, an image of the user is transmitted so that the other user supposed to give a response to the request is capable of identifying the user making the request before giving the response. In the following description, the user making a request for a start of a remote communication is referred to as a request-side user whereas the other user supposed to give a response to the request is referred to as a response-side user.

SUMMARY OF THE INVENTION

In the communication system described above, however, even though the response-side user is capable of identifying the request-side user, it is difficult for the request-side user to recognize the condition of the response-side user.

Thus, if the response-side user does not respond to a request for a start of a remote communication, the request-side user will hesitate to make the request several times, raising a problem of a difficulty to give a request for a remote-communication start to the response-side user except that the request is for a start of a remote communication involving a special business.

As a result, a remote communication is not carried out due to such a hesitation, raising another problem of obstructions to popularization of the remote communication.

Addressing the problems described above, inventors of the present invention have devised a communication system allowing users present at locations remote from each other to smoothly start a communication of images and voices between each other.

According to an embodiment of the present invention, there is provided an information-processing apparatus including:

disclosure-information sender means for transmitting user-disclosure information composed of information, which is allowed to be disclosed to an other information-processing apparatus, to the other information-processing apparatus;

disclosure-information receiver means for receiving other user-disclosure information from the other information-processing apparatus;

display control means for controlling a process to display user-disclosure information received by the disclosure-information receiver means;

connection request means for making a request for a connection to an other information-processing apparatus in accordance with an operation carried out by a user;

connection-permission determination means for producing a determination result as to whether or not a connection requested by the connection request means as a connection to an other information-processing apparatus has been permitted by the other information-processing apparatus on the basis of a response received from the other information-processing apparatus; and communication means for transmitting an image and voice of the user to an other information-processing apparatus and receiving an image and voice of an other user from the other information-processing apparatus in case a determination result produced by the connection-permission determination means indicates that a connection with the other information-processing apparatus has been permitted by the other information-processing apparatus.

It is possible to provide a configuration in which the user-disclosure information is information allowed to be disclosed to an other information-processing apparatus and includes any acquirable ones of information on content being viewed, the number of content-viewing users, a voice or image of a user, information on an environment surrounding a user, and status of a connection made through a network.

It is possible to provide a configuration in which the disclosure-information sender means transmits user-disclosure information to an other information-processing apparatus periodically or when the disclosure-information receiver means receives user-disclosure information from the other information-processing apparatus.

It is possible to provide a configuration in which the information-processing apparatus according to an embodiment of the present invention further includes:

synchronous reproduction means for reproducing content data having the same substance as content data, which is being reproduced by an other information-processing apparatus, synchronously with reproduction of the content data in the other information-processing apparatus; and synthesis means for synthesizing a sound and image of content data synchronously reproduced by the synchronous reproduction means with a voice and image received by the communication means as a voice and image of an other user.

According to an embodiment of the present invention, there is provided an information-processing method including the steps of:

transmitting user-disclosure information composed of information, which is allowed to be disclosed to an other information-processing apparatus, to the other information-processing apparatus;

receiving other user-disclosure information from an other information-processing apparatus;

controlling a process to display user-disclosure information received in a process carried out at the disclosure-information receiver step;

making a request for a connection to an other information-processing apparatus in accordance with an operation carried out by a user operating an information-processing apparatus;

producing a determination result as to whether or not a connection requested in a process carried out at the connection request step as a connection to an other information-processing apparatus has been permitted by the other information-processing apparatus on the basis of a response received from the other information-processing apparatus; and communicating for transmitting an image and voice of the user to an other information-processing apparatus and receiving an image and voice of an other user from the other information-processing apparatus in case a determination result produced in a process carried out at the connection-permission determination step indicates that a connection with the other information-processing apparatus has been permitted by the other information-processing apparatus.

According to an embodiment of the present invention, there is provided a recording medium for recording a program. The program includes the steps of:

transmitting user-disclosure information composed of information, which is allowed to be disclosed to an information-processing apparatus, to the information-processing apparatus;

receiving other user-disclosure information from the information-processing apparatus;

controlling a process to display user-disclosure information received in a process carried out at the disclosure-information receiver step;

making a request for a connection to the information-processing apparatus in accordance with an operation carried out by a user operating a computer executing the program;

producing a determination result as to whether or not a connection requested in a process carried out at the connection request step as a connection to the information-processing apparatus has been permitted by the information-processing apparatus on the basis of a response received from the information-processing apparatus; and communicating for transmitting an image and voice of the user to the information-processing apparatus and receiving an image and voice of an other user from the information-processing apparatus in case a determination result produced in a process carried out at the connection-permission determination step indicates that a connection with the information-processing apparatus has been permitted by the information-processing apparatus.

According to an embodiment of the present invention, there is provided a program including the steps of:

transmitting user-disclosure information composed of information, which is allowed to be disclosed to an information-processing apparatus, to the information-processing apparatus;

receiving other user-disclosure information from the information-processing apparatus;

controlling a process to display user-disclosure information received in a process carried out at the disclosure-information receiver step;

making a request for a connection to the information-processing apparatus in accordance with an operation carried out by a user operating a computer executing the program;

producing a determination result as to whether or not a connection requested in a process carried out at the connection request step as a connection to the information-processing apparatus has been permitted by the information-processing apparatus on the basis of a response received from the information-processing apparatus; and communicating for transmitting an image and voice of the user to the information-processing apparatus and receiving an image and voice of an other user from the information-processing apparatus in case a determination result produced in a process carried out at the connection-permission determination step indicates that a connection with the information-processing apparatus has been permitted by the information-processing apparatus.

According to an embodiment of the present invention, there is provided an information-processing apparatus including:

a disclosure-information sender section for transmitting user-disclosure information composed of information, which is allowed to be disclosed to an other information-processing apparatus, to the other information-processing apparatus;

a disclosure-information receiver section for receiving other user-disclosure information from an other information-processing apparatus;

a display control section for controlling a process to display user-disclosure information received by the disclosure-information receiver section;

a connection request section for making a request for a connection to an other information-processing apparatus in accordance with an operation carried out by the user;

a connection-permission determination section for producing a determination result as to whether or not a connection requested by the connection request means as a connection to an other information-processing apparatus has been permitted by the other information-processing apparatus on the basis of a response received from the other information-processing apparatus; and a communication section for transmitting an image and voice of the user to an other information-processing apparatus and receiving an image and voice of an other user from the other information-processing apparatus in case a determination result produced by the connection-permission determination section indicates that a connection with the other information-processing apparatus has been permitted by the other information-processing apparatus.

As described above, in accordance with an embodiment the present invention, user-disclosure information composed of information allowed to be disclosed to an other information-processing apparatus is transmitted from an information-processing apparatus to the other information-processing apparatus, and other user-disclosure information is received from the other information-processing apparatus. A process to display user-disclosure information received from the other information-processing apparatus is controlled and a request for a connection to the other information-processing apparatus is made in accordance with an operation carried out by a user operating the information-processing apparatus. The determination result as to whether or not the requested connection has been permitted is produced on the basis of a response received from the other information-processing apparatus. Then, an image and voice of the user operating the information-processing apparatus are transmitted to the other information-processing apparatus whereas image and voice of an other user are received from the other information-processing apparatus in case the determination result indicates that the requested connection with the other information-processing apparatus has been permitted by the other information-processing apparatus.

A network is a mechanism for connecting at least two apparatus to each other and propagating information from one apparatus to another. Apparatus communicating with each other through the network can be independent apparatus or internal blocks included in one apparatus.

Communication can of course be radio or wire communication. As an alternative, communication can also be a combination of the radio communication and the wire communication, which are mixed with each other. That is to say, the radio communication is adopted for certain areas while the wire communication is carried out for other areas. As an alternative, the radio communication and the wire communication are mixed with each other by applying the radio communication to communications from a certain apparatus to another apparatus but applying the wire communication to communications from the other apparatus to the certain apparatus.

According to an embodiment of the present invention, communications of image and voices between information-processing apparatus can be started smoothly. Also in accordance with the present invention, an information-processing apparatus is capable of participating in a communication already in execution with ease.

BRIEF DESCRIPTION OF THE DRAWINGS

These and other objects of the present invention will be seen by reference to the description, taken in connection with the accompanying drawings, in which:

FIG. 4 is a block diagram showing a typical configuration of a communication apparatus employed in the communication system shown in FIG. 1;

FIG. 5 shows a flowchart referred to in explanation of remote-communication processing carried out by a communication apparatus employed in the communication system shown in FIG. 1;

FIG. 7 is an explanatory diagram showing a typical configuration of cataloged-member information stored in a member-information storage section employed in the session management session shown in FIG. 6;

FIG. 8 is an explanatory diagram showing a typical configuration of user-setting information stored in a user-information storage section shown in FIG. 6 as a section employed in the communication apparatus shown in FIG. 4;

FIG. 16 is a block diagram showing a typical configuration of a personal computer according to an embodiment of the present invention.

DETAILED DESCRIPTION OF THE PREFERRED EMBODIMENTS

Before preferred embodiments of the present invention are explained, relations between disclosed inventions and the embodiments are explained in the following comparative description. It is to be noted that, even if there is an embodiment described in this specification but not included in the following comparative description as an embodiment corresponding to an invention, such an embodiment is not to be interpreted as an embodiment not corresponding to an invention. Conversely, an embodiment included in the following comparative description as an embodiment corresponding to a specific invention is not to be interpreted as an embodiment not corresponding to an invention other than the specific invention.

In addition, the following comparative description is not to be interpreted as a comprehensive description covering all inventions disclosed in this specification. In other words, the following comparative description by no means denies existence of inventions disclosed in this specification but not included in claims as inventions for which a patent application is filed. That is to say, the following comparative description by no means denies existence of inventions to be included in a separate application for a patent, included in an amendment to this specification, or added in the future.

Figure 6:
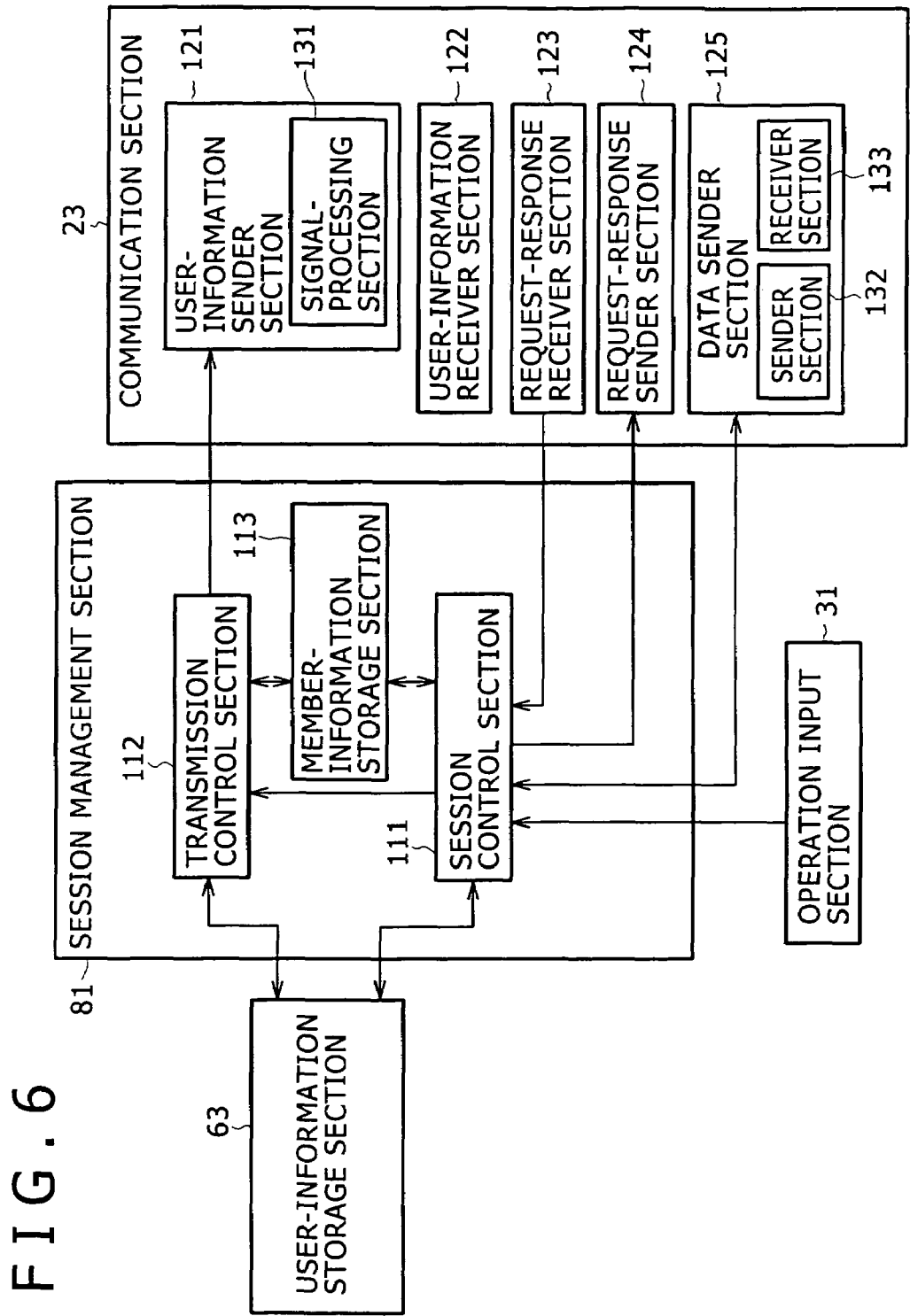
FIG. 6 is a block diagram showing detailed typical configurations of a session management section and a communication section, which are employed in the communication apparatus shown in FIG. 4.

An information-processing apparatus (such as a communication apparatus 1-1 shown in FIG. 1) according to an embodiment of the present invention includes:

disclosure-information sender means (such as a user-information transmission section 121 shown in FIG. 6) for transmitting user-disclosure information composed of information, which is allowed to be disclosed to an other information-processing apparatus (such as a communication apparatus 1-2 shown in FIG. 1), to the other information-processing apparatus;

disclosure-information receiver means (such as a user-information reception section 122 shown in FIG. 6) for receiving other user-disclosure information from an other information-processing apparatus;

display control means (such as a synthesis control section 84 shown in FIG. 4) for controlling a process to display user-disclosure information received by the disclosure-information receiver means;

connection request means (such as a request-response transmission section 124 shown in FIG. 6) for making a request for a connection to an other information-processing apparatus in accordance with an operation carried out by a user;

connection-permission determination means (such as a session control section 111 shown in FIG. 6) for producing a determination result as to whether or not a connection requested by the connection request means as a connection to an other information-processing apparatus has been permitted by the other information-processing apparatus on the basis of a response received from the other information-processing apparatus; and communication means (such as a data transmission section 125 shown in FIG. 6) for transmitting an image and voice of the user to an other information-processing apparatus and receiving an image and voice of an other user from the other information-processing apparatus in case a determination result produced by the connection-permission determination means indicates that a connection with the other information-processing apparatus has been permitted by the other information-processing apparatus.

The information-processing apparatus according to the embodiment of the present invention further includes:

synchronous reproduction means (such as content reproduction section 25 shown in FIG. 4) for reproducing content data having the same substance as content data, which is being reproduced by an other information-processing apparatus, synchronously with reproduction of the content data in the other information-processing apparatus; and synthesis means (such as a audio/video synthesis section 26 shown in FIG. 4) for synthesizing a sound and image of content data synchronously reproduced by the synchronous reproduction means with a voice and image received by the communication means as a voice and image of an other user.

Figure 9:
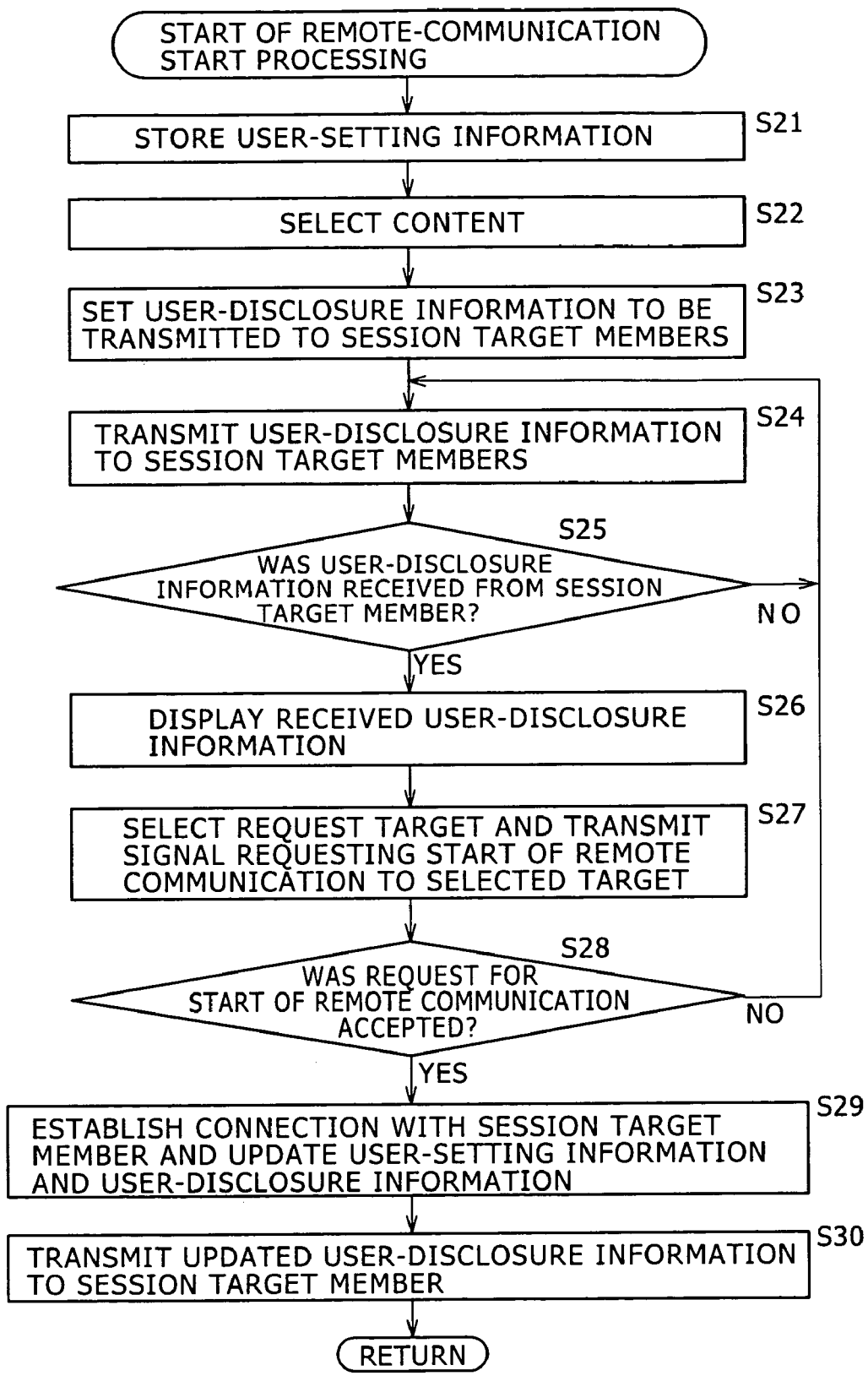
FIG. 9 shows a flowchart referred to in explanation of remote-communication start processing carried out at a step S1 of the flowchart shown in FIG. 5.

An information-processing method according to another embodiment of the present invention includes the steps of:

transmitting user-disclosure information composed of information, which is allowed to be disclosed to an other information-processing apparatus, to the other information-processing apparatus (such as a step S24 of a flowchart shown in FIG. 9);

receiving other user-disclosure information from an other information-processing apparatus (such as a step S25 of the flowchart shown in FIG. 9);

controlling a process to display user-disclosure information received in a process carried out at the disclosure-information receiver step (such as a step S26 of the flowchart shown in FIG. 9);

making a request for a connection to an other information-processing apparatus in accordance with an operation carried out by a user operating an information-processing apparatus (such as a step S27 of the flowchart shown in FIG. 9);

producing a determination result as to whether or not a connection requested in a process carried out at the connection request step as a connection to an other information-processing apparatus has been permitted by the other information-processing apparatus on the basis of a response received from the other information-processing apparatus (such as a step S28 of the flowchart shown in FIG. 9); and communicating for transmitting an image and voice of the user to an other information-processing apparatus and receiving an image and voice of an other user from the other information-processing apparatus in case a determination result produced in a process carried out at the connection-permission determination step indicates that a connection with the other information-processing apparatus has been permitted by the other information-processing apparatus (such as a step S2 of a flowchart shown in FIG. 5).

It is to be noted that relations between a recording medium and a concrete implementation of the present invention are the same as the relations described above as relations between the information-processing method and a concrete implementation of the present invention. By the same token, relations between a program and a concrete implementation of the present invention are the same as the relations described above as relations between the information-processing method and a concrete implementation of the present invention. Thus, the relations between the recording mediums and the concrete implementation as well as the relations between the program and the concrete implementation of the present invention are not explained to avoid duplications.

The embodiments of the present invention are explained in detail by referring to diagrams as follows.

Figure 1:
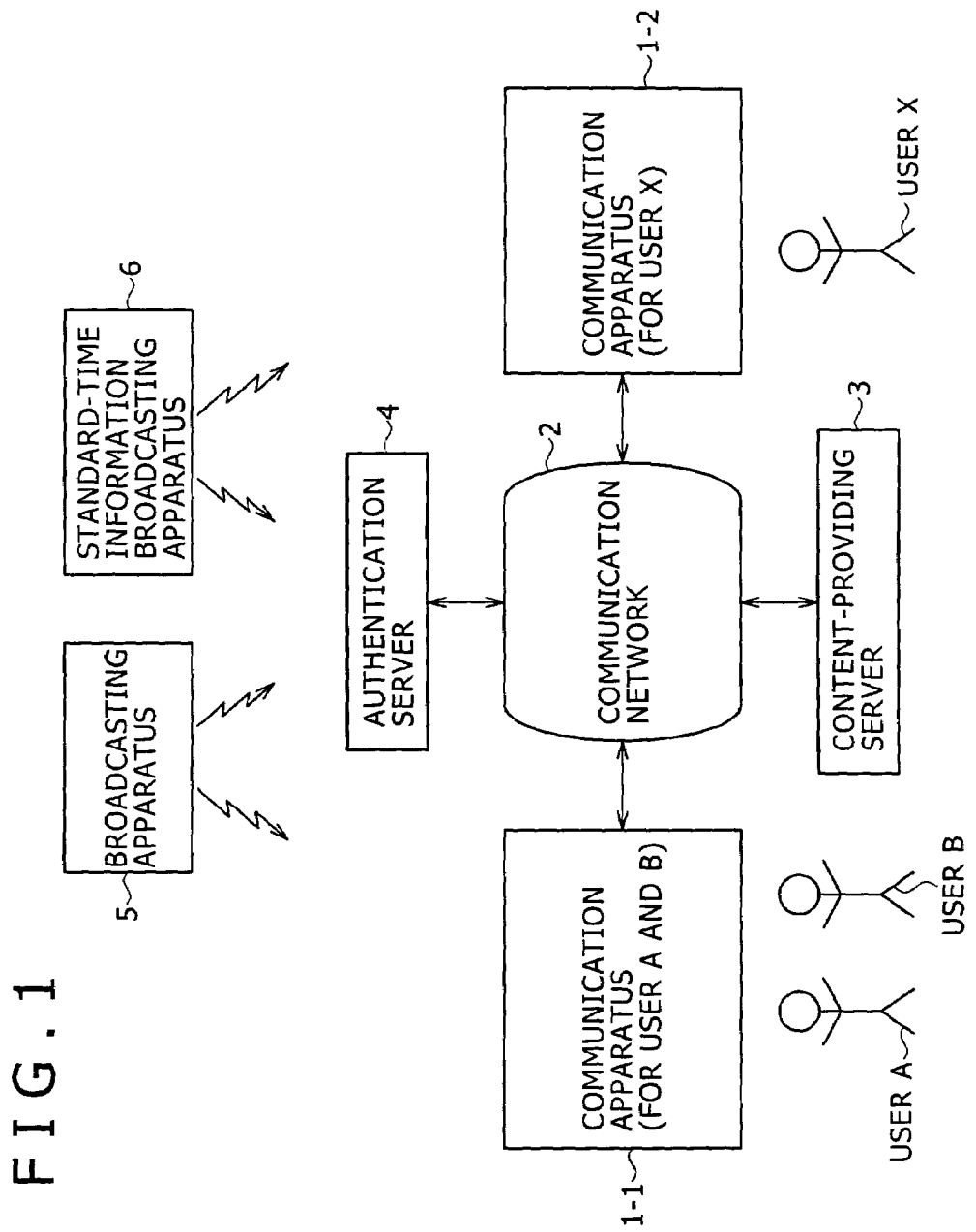
FIG. 1 is a diagram showing a typical configuration of a communication system according to an embodiment of the present invention.

FIG. 1 is a diagram showing a typical configuration of a communication system according to an embodiment of the present invention. In this communication system, a communication apparatus 1-1 is connected to an other communication apparatus 1 through a communication network 2. In the case of the typical configuration shown in FIG. 1, a communication apparatus 1-2 serves as the other communication apparatus 1. The communication apparatus 1-1 and 1-2 exchange images of their users as well as user voices with each other in a way similar to the so-called television telephone. In addition, the communication apparatus 1-1 reproduces a content common to the communication apparatus 1-1 and 1-2 synchronously with the communication apparatus 1-2. By displaying a common content in this way, remote communication between users is supported. In the following, the process is called remote communication processing. In the following descriptions, the communication apparatus 1-1 and 1-2 are each referred to simply as the communication apparatus 1 in case it is not necessary to distinguish the communication apparatus 1-1 and 1-2 from each other.

It is to be noted that examples of the common content are a program content obtained as a result of receiving a television broadcast, the content of an already acquired movie or the like obtained by downloading, a private content exchanged between users, a game content, a musical content, and a content prerecorded on an optical disk represented by a DVD (Digital Versatile Disk). It is to be noted that the optical disk itself is not shown in the figure.

The communication apparatus 1 can be utilized by a plurality of users at the same time. In the case of the typical configuration shown in FIG. 1, for example, users A and B utilize the communication apparatus 1-1 whereas a user X utilizes the communication apparatus 1-2.

Figure 2A:
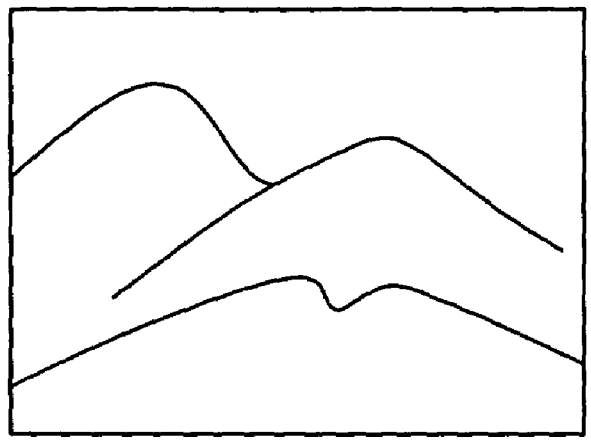
FIGS. 2A to 2C are diagrams showing a typical image of a content and typical images of users in the communication system shown in FIG. 1.
Figure 2B:
Figure 2C:
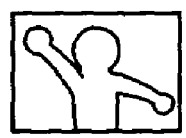

As an example, an image of a common content is shown in FIG. 2A. An image taken by the communication apparatus 1-1 is an image of the user A like one shown in FIG. 2B. On the other hand, an image taken by the communication apparatus 1-2 is an image of the user X like one shown in FIG. 2C. In this case, a display unit 41 employed in the communication apparatus 1-1 as shown in FIG. 4 displays a picture-in-picture screen like one shown in FIG. 3A, a cross-fade screen like one shown in FIG. 3B, or a wipe screen like one shown in FIG. 3C. In either case, the image of the common content and the images of the users are superposed on each other.

Figure 3A:
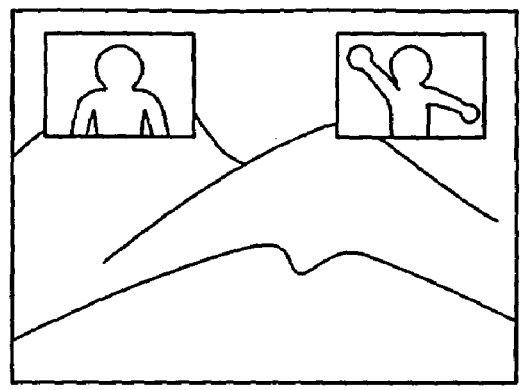
FIGS. 3A to 3C are diagrams showing typical patterns of synthesis of a content image with user images.

It is to be noted that, on the picture-in-picture display like the one shown in FIG. 3A, the images of the users are each superposed on the image of the common content as a subscreen. The position and size of each of the subscreens can be changed in an arbitrary manner. In addition, instead of displaying the images of both the users, that is, instead of displaying both of the image of the user A itself and the image of the user X serving as a communication partner of the user A, only the image of either of the users can be displayed.

Figure 3B:
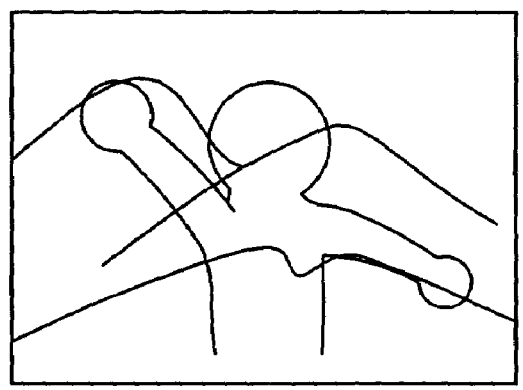

In the cross-fade screen like the one shown in FIG. 3B, the image of the common content is synthesized with the image of a user, which can be the user A or X. This cross-fade screen can be used for example when the user points to an arbitrary position or area on the image of the common content.

Figure 3C:
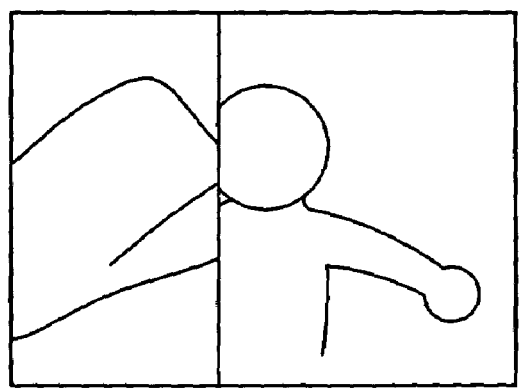

In the wipe screen like the one shown in FIG. 3C, the image of a user appears on the screen while moving in a certain direction, gradually covering the image of the common content. In the typical screen shown in FIG. 3C, the image of the user appears from the right side.

The above synthesis patterns of the screen can be changed from time to time. In addition, each of the synthesis patterns has synthesis parameters such as image balance to set the transparency of each image in the synthesis patterns shown in FIGS. 3A to 3C and volume balance to set the volumes of the content and the users. These synthesis parameters can also be changed from time to time. A history showing changes of the synthesis pattern from one to another and changes of the synthesis parameters is stored in a synthesis-information storage section 64 as shown in FIG. 4. It is to be noted that the pattern to display the image of the content and the images of the users is not limited to the synthesis patterns described above. That is to say, the images can also be displayed as a synthesis pattern other than the patterns described above.

Refer back to FIG. 1. The communication network 2 is a broadband data communication network represented by typically the Internet. At a request made by a communication apparatus 1, a content-providing server 3 supplies a content to the communication apparatus 1 by way of the communication network 2. Before a user of a communication apparatus 1 can utilize the communication system, an authentication server 4 authenticates the user. In addition, the authentication server 4 also carries out an accounting process and other processing for a successfully authenticated user.

A broadcasting apparatus 5 is a unit for transmitting a content, which is typically a program of a television broadcast or the like. Thus, the communication apparatus 1 are capable of receiving and reproducing the content from the broadcasting apparatus 5 in a synchronous manner. It is to be noted that the broadcasting apparatus 5 is capable of transmitting a content to the communication apparatus 1 by radio or wire communication. In addition, the broadcasting apparatus 5 may also transmit a content to the communication apparatus 1 by way of the communication network 2.

A standard-time information broadcasting apparatus 6 is a unit for supplying information on a standard time to the communication apparatus 1. The standard time information is used for correctly synchronizing a standard-time measurement section 30, which is employed in each of the communication apparatus 1 as shown in FIG. 4 to serve as a clock, to a standard time. The standard time measured by a clock can typically be the world or Japanese standard time. It is to be noted that the standard-time information broadcasting apparatus 6 is capable of transmitting the information on a standard time to the communication apparatus 1 by radio or wire communication. In addition, the standard-time information broadcasting apparatus 6 may also transmit the information on a standard time to the communication apparatus 1 by way of the communication network 2.

In the typical communication system shown in FIG. 1, only two communication apparatus 1 are connected to each other by the communication network 2. It is also worth noting, however, that the number of communication apparatus 1 connected to the communication network 2 is not limited to two. That is to say, any plurality of communication apparatus 1 including communication apparatus 1-3 and 1-4 can be connected to each other by the communication network 2.

Next, a typical configuration of the communication apparatus 1-1 is explained in detail by referring to FIG. 4.

An output section 21 employed in the communication apparatus 1-1 includes a display unit 41 and a speaker 42. The output section 21 displays an image corresponding to a video signal received from an audio/video synthesis section 26 on the display unit 41 and outputs a sound corresponding to an audio signal received from the audio/video synthesis section 26 to the speaker 42.

The input section 22-1 includes a camera 51-1, a microphone 52-1, and a sensor 53-1. By the same token, the input section 22-2 includes a camera 51-2, a microphone 52-2, and a sensor 53-2. In the following descriptions, the input sections 22-1 and 22-2 are each referred to simply as the input section 22 in case it is not necessary to distinguish the input sections 22-1 and 22-2 from each other. In the same way, the cameras 51-1 and 51-2 are each referred to simply as the camera 51 in case it is not necessary to distinguish the cameras 51-2 and 51-2 from each other. By the same token, the microphones 52-1 and 52-2 are each referred to simply as the microphone 52 in case it is not necessary to distinguish the microphones 52-1 and 52-2 from each other. Likewise, the sensors 53-1 and 53-2 are each referred to simply as the sensor 53 in case it is not necessary to distinguish the sensors 53-1 and 53-2 from each other.

The camera 51 is a component for taking an image of the user. The image of the user can be a moving or still image. The microphone 52 is a component for collecting voices of the user and other sounds. The sensor 53 is a component for detecting information on an environment surrounding the user. The information on the environment includes the brightness, the ambient temperature, and the humidity. The input section 22 outputs the acquired image, voices/sounds, and information on the environment to a communication section 23, a storage section 27, and a data analysis section 28 as RT (Real Time) data of the user. In addition, the input section 22 also outputs the acquired user image and user voices to the audio/video synthesis section 26.

It is to be noted that a plurality of input sections 22 can also be provided, being oriented toward a plurality of respective users. In the case of the communication apparatus 1-1 shown in FIG. 4, for example, two input sections 22 are provided, being oriented toward the two users A and B shown in FIG. 1.

The communication section 23 is a unit for transmitting real-time data input by the input section 22 as data of the users A and/or B to the communication apparatus 1-2 serving as a communication partner by way of the communication network 2 and receiving real-time data of the user X from the communication apparatus 1-2. The communication section 23 supplies the real-time data of the user X to the audio/video synthesis section 26 and the storage section 27. In addition, the communication section 23 also receives a content transmitted by the communication apparatus 1-2 or the content-providing server 3 by way of the communication network 2 and supplies the content to a content reproduction section 25 and the storage section 27. Such a content is also referred to hereafter as content data. The communication section 23 transmits a content, information on an operation, control information, a request, and response to the communication apparatus 1-2 by way of the communication network 2. The content is a content read out from the storage section 27, and the information is operation information and control information generated by an operation-information output section 87. The request and a response are a request and response generated by a session management section 81.

Furthermore, prior to a start of a remote communication, the communication section 23 transmits user-disclosure information to the communication apparatus 1-2 by way of the communication network 2 serving as a partner of the remote communication to be started. The user-disclosure information includes user-setting information stored in a user-information storage section 63 as information that can be disclosed to the communication apparatus 1-2. In addition, the user-disclosure information also includes information included in input real-time data of the user operating the communication apparatus 1-1.

A broadcast receiver section 24 is a unit for receiving a television broadcast signal broadcasted by the broadcasting apparatus 5 and supplying a broadcasted program conveyed by the signal as a content to the content reproduction section 25 and, if necessary, to the storage section 27. The content reproduction section 25 is a unit for reproducing a content, which is a broadcasted program received by the broadcast receiver section 24. The reproduced content may also a content received by the communication section 23, a content read out from the storage section 27, or a content read out from a disk such as an optical disk. It is to be noted that the disk itself is not shown in the figure. The content reproduction section 25 supplies a sound and image of the reproduced content to the audio/video synthesis section 26 and the data analysis section 28.

The audio/video synthesis section 26 is a unit for mixing an image and sound received from the content reproduction section 25 as an image and sound of a content, an image and voice received from the input section 22 as an image and voice of the user A, an image and voice received from the communication section 23 as an image and voice of the user X as well as a character string for typically arousing the alert for the user A and supplying a video signal obtained as the synthesis result to the output section 21. Referred to hereafter as a synthesis process, the mixing process carried out by the audio/video synthesis section 26 is a process of blending and adjusting images, sounds, voices and character strings.

The storage section 27 includes a content storage section 61, a license storage section 62, a user-information storage section 63, and the synthesis-information storage section 64 mentioned before. The content storage section 61 is a unit for storing data received from the input section 22 as real-time data of a user such as the user A, data received from the communication section 23 as real-time data of the communication partner such as the user X, a broadcast program received from the broadcast receiver section 24 as a content, and a content received from the communication section 23. The license storage section 62 is a unit for storing information such as a license granted to the communication apparatus 1-1 as a license for utilizing a content stored in the content storage section 61.

The user-information storage section 63 is a unit for storing user-setting information, which is set when the user A operating the communication apparatus 1-1 connects the communication apparatus 1-1 to a communication apparatus serving as a partner of a remote communication being started. Described later by referring to FIG. 8, the user-setting information typically includes information on status of utilization of the communication apparatus 1-1, information on a content being reproduced by the communication apparatus 1-1, information on a partner of a remote communication being started, and level information. The level information indicates which element of the user-setting information is to be transmitted as user-disclosure information to the partner of a remote communication being started. User-disclosure information can be disclosed to the partner of a remote communication being started. The synthesis-information storage section 64 is a unit for storing each synthesis pattern and every synthesis parameter, which can be changed by a synthesis control section 84, as synthesis information.

Composed of a user-characteristic analysis section 71 and a control-information generation section 72, the data analysis section 28 is a unit for inputting data received from the input section 22 as real-time data of a user such as the user A, data received from the communication section 23 as real-time data of the communication partner such as the user X, and a content received from the content reproduction section 25.

The user-characteristic analysis section 71 is a unit for analyzing characteristics of information including the posture of each user, the number of users, voices of each user, and the condition of users and supplying an analysis result to the control-information generation section 72. The condition of users is information on an environment surrounding each of the users. The information, the characteristics of which are analyzed, is obtained from data received from the input section 22 as real-time data of the users including the user A from data received from the communication section 23 as real-time of another user such as the user X. In addition the control-information generation section 72 is a unit for generating control information used for executing control of the audio/video synthesis section 26 in accordance with the analysis results and outputting the generated control information to the control section 32. In this case, the audio/video synthesis section 26 is controlled to synthesize an image and voice of data received from the communication section 23 as real-time data of the communication partner such as the user X with an image and sound of a content received from the content reproduction section 25 on the basis of synthesis parameters and synthesis pattern according to the analysis result. In addition, the control-information generation section 72 also generates control information to be used for executing control of sections employed in the communication apparatus 1-2, which serves as the communication partner. In this case, the control-information generation section 72 outputs the control information to the operation-information output section 87.

A communication-environment detection section 29 is a unit for monitoring an environment of communication with the communication apparatus 1-2 through the communication section 23 and the communication network 2 and outputting a result of the monitoring to the control section 32. The environment of communication includes a communication rate and a communication delay time. A standard-time measurement section 30 is a unit for adjusting a standard time measured by itself on the basis of a standard time received from the standard-time information broadcasting apparatus 6 and supplying the adjusted standard time to the control section 32. An operation input section 31 is typically a remote controller for accepting an operation carried out by the user and issuing a command corresponding to the operation to the control section 32.

The control section 32 is a unit for controlling other components of the communication apparatus 1-1 on the basis of information such as a signal representing an operation received by the operation input section 31 as an operation carried out by the user and control information received from the data analysis section 28. The control section 32 includes a session management section 81, a viewing/listening recording level setting section 82, a reproduction synchronization section 83, the aforementioned synthesis control section 84, a reproduction permission section 85, a recording permission section 86, the operation-information output section 87 mentioned above, and an electronic-apparatus control section 88. It is to be noted that, in the typical configuration shown in FIG. 4, control lines used for outputting control commands from the control section 32 to other components of the communication apparatus 1-1 are omitted.

The session management section 81 is a unit for controlling processes carried out by the communication section 23 to connect the communication apparatus 1-1 to other apparatus such as the content-providing server 3 and the authentication server 4 through the communication network 2 and start a remote communication with the communication apparatus 1-2 also through the communication network 2. In the following the above process is also referred to as a remote-communication start process.

That is to say, in the remote-communication start process, user-disclosure information is exchanged between the session management section 81 and a partner apparatus (such as the communication apparatus 1-2) with which a communication is started. As a result, the communication apparatus 1-1 is connected to the partner apparatus, with which a communication is started, in accordance with a mutual consent resulting from a request made by the communication apparatus 1-1 and a permission given by the apparatus as a permission of the request. As the communication apparatus 1-1 is connected to the partner apparatus, a remote communication is started by communications such as an exchange of real-time data between the communication apparatus 1-1 and the partner apparatus as well as reproduction of a content in the communication apparatus 1-1 synchronously with reproduction of the same content in the partner apparatus. After the connection is established, the session management section 81 sends and receives user-disclosure information that is permitted to disclose to the other apparatus with which a communication is started.

The viewing/listening recording level setting section 82 is a unit for determining whether or not real-time data acquired by the input section 22 as data of the user A or other users and/or a content stored in the content storage section 61 as a personal content of the user can be reproduced and recorded by the communication apparatus 1-2, which serves as the communication partner, on the basis of an operation carried out by the user. If the real-time data and/or the personal content are determined to be data and/or a content that can be recorded by the communication apparatus 1-2, the recordable number of times the data and/or the content can be recorded and other information are set. This set information is added to the real-time data of the user as privacy information and transmitted to the communication apparatus 1-2 from the communication section 23. The reproduction synchronization section 83 is a unit for controlling the content reproduction section 25 to reproduce a content common to the communication apparatus 1-2 synchronously with content reproduction in the communication apparatus 1-2, which serves as the communication partner. The content common to the communication apparatus 1-2 is a content having the same substance as a content reproduced in the communication apparatus 1-2.

The synthesis control section 84 is a unit for controlling the data analysis section 28 to analyze user-condition information, which is obtained from real-time data of the user, on the basis of an operation carried out by the user. In addition, the synthesis control section 84 also controls the audio/video synthesis section 26 to synthesize an image of a content with images of users and synthesize a voice of a content with voices of users in accordance with an operation carried out by the user or control information received from the data analysis section 28. That is to say, on the basis of the control information received from the data analysis section 28, the synthesis control section 84 changes setting of the synthesis pattern to any of the patterns shown in FIGS. 3A to 3C and setting of synthesis parameters of the newly set synthesis pattern. The synthesis control section 84 then controls the audio/video synthesis section 26 in accordance with the newly set synthesis pattern and the synthesis parameters. In addition, the synthesis control section 84 records the newly set synthesis pattern and the synthesis parameters in the synthesis-information storage section 64 as synthesis information.

The reproduction permission section 85 is a unit for outputting a determination result as to whether or not a content can be reproduced on the basis of information such as a license attached to the content and/or the privacy information set by the viewing/listening recording level setting section 82 employed in the communication partner and controlling the content reproduction section 25 on the basis of the determination result. The recording permission section 86 is a unit for outputting a determination result as to whether or not a content can be recorded on the basis of information including a license attached to the content and/or the privacy information and controlling the storage section 27 on the basis of the determination result.

The operation-information output section 87 is a unit for generating operation information for an operation carried out by the user and transmitting the information to the communication apparatus 1-2 serving as the communication partner by way of the communication section 23. The operation carried out by the user can be an operation to change a channel to receive a television broadcast, an operation to start a process to reproduce a content, an operation to end a process to reproduce a content, an operation to reproduce a content in a fast-forward process, or another operation. The operation information includes a description of the operation and a time at which the operation is carried out. Details of the operation information will be described later. The operation information is used in synchronous reproduction of a content. In addition, the operation-information output section 87 also transmits control information received from the data analysis section 28 to the communication apparatus 1-2 by way of the communication section 23.

The electronic-apparatus control section 88 is a unit for controlling a predetermined electronic apparatus, which is connected to the communication apparatus 1-1 as a peripheral, on the basis of an operation carried out by the user or control information received from the data analysis section 28. Examples of the predetermined electronic apparatus are an illumination apparatus and an air-conditioning apparatus, which are not shown in the figure.

It is to be noted that, since a detailed typical configuration of the communication apparatus 1-2 is the same as that of the communication apparatus 1-1 shown in FIG. 4, no special explanation of the detailed typical configuration of the communication apparatus 1-2 is given.

Next, remote communication processing carried out by the communication apparatus 1-1 to communicate with the communication apparatus 1-2 is explained by referring to a flowchart shown in FIG. 5 as follows. It is to be noted that the communication apparatus 1-2 also carries out this processing in the same way as the communication apparatus 1-1.

The session management section 81 starts this communication processing when the power supply of the communication apparatus 1-1 is turned on and the user operates the operation input section 31 to enter a command making a request for a start of a remote communication with the communication apparatus 1-2. When the user operates the operation input section 31 to enter such a command, the operation input section 31 supplies an operation signal representing the command to the control section 32, which then executes control to start the remote communication.

When the operation input section 31 supplies such an operation signal to the control section 32, in a process carried out at the first step S1 of the flowchart shown in FIG. 5, the session management section 81 performs the remote-communication start processing to be described in detail later. At the step S1, the communication apparatus 1-1 and 1-2 exchanges user-disclosure information, which is information on a user that can be disclosed to other users. The user-disclosure information of a user can be user-setting information stored in the communication apparatus operated by the user or real-time data of the user. As a result, the communication apparatus 1-1 is connected to the communication apparatus 1-2 in accordance with a mutual consent resulting from a request made by the communication apparatus 1-1 and a permission given by the apparatus 1-2. As the communication apparatus 1-1 is connected to the communication apparatus 1-2, a remote communication is started. Then, the flow of the processing goes on to a step S2.

In a process carried out at the step S2, the communication section 23 starts transmitting real-time data of the user A and other real-time data, which are received from the input section 22, to the apparatus 1-2 by way of the communication network 2 on the basis of control executed by the session management section 81. The communication section 23 also starts receiving real-time data of the user X from the communication apparatus 1-2. Then, the flow of the processing goes on to a step S3. At that time, data received from the input section 22 as the real-time data of the user A and the other real-time data as well as real-time data received from the communication apparatus 1-2 as the real-time data of the user X are supplied to the data analysis section 28. The data of images and voices are supplied to the audio/video synthesis section 26.

Receiving the image and voice included in the real-time data of the user A and the image and voice included the other real-time data as well as the image and voice included in the real-time data of the user X, in accordance with control executed by the synthesis control section 84, the audio/video synthesis section 26 synthesizes these images and voices with an image and sound of a content being reproduced. Then, the audio/video synthesis section 26 supplies video and audio signals obtained as a synthesis result to the output section 21.

As a result, the display unit 41 shows the image of the user X as an image superposed on the image of the content being reproduced whereas the speakers 42 output a sound obtained as a synthesis result of the content being reproduced and the voice of the user X. It is to be noted that the substance of the content being reproduced in the communication apparatus 1-1 is different from the substance of the content being reproduced in the communication apparatus 1-2. Even if the substance of the content being reproduced in the communication apparatus 1-1 is the same as that in the communication apparatus 1-2, the contents are not being reproduced synchronously with each other.

In a process carried out at the step S3, the reproduction-permission section 85 establishes a connection with the authentication server 4 through the communication network 2 in order to carry out a content-utilization authentication process for synchronous reproduction of the contents being reproduced or a content specified by the user. By carrying out the content-utilization authentication process, the reproduction of the content is permitted in the communication apparatus 1-1 in accordance with copyright protection and privacy protection. By the same token, the reproduction of the same content is permitted in the communication apparatus 1-2. In this way, preparation of the synchronous reproduction is completed. Then, the flow of the processing goes on to a step S4.

It is to be noted that, in the case of a content, for which neither the copyright protection nor the privacy protection is requested in a reproducing or viewing process thereof, the process of the step S3 is not necessary. An example of such a content is a television broadcast. In a process to reproduce a content stored in the content storage section 61, however, execution of the process of the step S3 is performed even if the stored content is that neither the copyright protection nor the privacy protection is requested in a reproducing or viewing process thereof.

At the step S4, the content reproduction section 25 starts a process to reproduce the content synchronized with the communication apparatus 1-2 on the basis of control executed by the reproduction synchronization section 83. Then, the flow of the processing goes on to a step S5. By carrying out the process to reproduce the content synchronized with the communication apparatus 1-2, the communication apparatus 1-1 and 1-2 reproduce the same content in a synchronous manner on the basis of a standard time supplied by the standard-time measurement section 30 (or the standard-time information broadcasting apparatus 6). The reproduced content is supplied to the audio/video synthesis section 26 and the data synthesis section 28.

At the step S5, the storage section 27 starts a remote communication recording process. Then, the flow of the processing goes on to a step S6. To put it concretely, the audio/video synthesis section 26 synthesizes the image and sound of the content, the synchronous reproduction of which has been started, the images and voices included in the input real-time data of the user A and the other input real-time data as well as the image and voices included in the received real-time data of the user X in accordance with control executed by the synthesis control section 84. Then, the audio/video synthesis section 26 supplies audio and video signals obtained as the synthesis result to the output section 21. It is to be noted that, at that time, the synthesis control section 84 controls the synthesis process, which is carried out by the audio/video synthesis section 26, on the basis of a synthesis pattern and synthesis parameters for the pattern. As described earlier, the synthesis pattern and synthesis parameters for the pattern have been set in advance in accordance with an operation carried out by the user.

The output section 21 displays an image based on the video signal supplied thereto and generates a sound based on the received audio signal. At this stage, exchanges of an image and a voice between the users and a process to reproduce a content in a synchronous manner have been started.

Then, a process is started as a process to record the content, the synchronous reproduction of which has been started, the images and voices included in the real-time data of the user A and the other real-time data as well as the images and voices included in the real-time data of the user X, and synthesis information including the synthesis pattern and the synthesis parameters.

In a process carried out at the step S6, in accordance with control executed by the synthesis control section 84, the data analysis section 28 and the audio/video synthesis section 26 carry out a user-characteristic analysis/mixing process. To put it concretely, in a process carried out at the step S6, the data analysis section 28 analyzes the characteristic of information on the conditions of users. Obtained from real-time data of each user, the information on the conditions of users includes information on the posture of each user, the number of users, a voice of each user, and information on the environment surrounding each user. Then, the data analysis section 28 generates control information, which is used for controlling sections including the audio/video synthesis section 26, on the basis of an analysis result. In this way, the synthesis control section 84 carries out a process to control synthesis processing executed by the audio/video synthesis section 26 by changing the synthesis pattern to another and properly setting synthesis parameters of the new synthesis pattern on the basis of an operation performed by the user in place of a synthesis pattern determined in advance in accordance with an operation performed by the user and synthesis parameters set in advance for the determined synthesis pattern.

Then, at the next step S7, the control section 32 produces a determination result as to whether or not the user has carried out an operation to make a request for termination of the remote communication. The control section 32 carries out the process of this step repeatedly till the user carries out such an operation. As the determination result produced in the process carried out at the step S7 indicates that the user has carried out an operation to make a request for termination of the remote communication, the flow of the processing goes on to a step S8.

At the step S8, the communication section 23 establishes a connection with the communication apparatus 1-2 through the communication network 2 on the basis of control, which is executed by the session management section 81, in order to notify the communication apparatus 1-2 that a remote communication has been ended. In response to this notice, the communication apparatus 1-2 returns an acknowledgement of the notification to the communication apparatus 1-1 as an acceptance of the termination of the remote communication.

Then, at the next step S9, the storage section 27 terminates the remote-communication-recording process. It is to be noted that, in this way, when a next remote communication is carried out later on, it is possible to utilize the stored data of the terminated remote communication. The stored data of the terminated remote communication includes the reproduced content, the images and voices included in the real-time data of the user A and the other real-time data as well as the images and voices included in the real-time data of the user X, and the synthesis information described above.

The processing of the remote communication processing carried out by the communication apparatus 1-1 as communication processing between the communication apparatus 1-1 and the communication apparatus 1-2 has been explained above.

Next, the following description explains details of the remote-communication start process carried out at the step S1 of the flowchart representing the remote-communication processing explained above by referring to FIG. 5.

FIG. 6 is a diagram showing detailed typical configurations of the session management section 81 and the communication section 23, which are sections for carrying out the remote-communication start process. It is to be noted that sections employed in the typical configurations shown in FIG. 6 as sections identical with their respective counterparts employed in the configuration shown in FIG. 4 are each denoted by the same reference numeral as the corresponding counterpart, and the descriptions of the identical sections are not repeated in order to properly avoid duplications.

In the typical configurations shown in FIG. 6, the session management section 81 includes a session control section 111, a transmission control section 112, and a member-information storage section 113 whereas the communication section 23 has a user-information sender section 121, a user-information receiver section 122, a request-response receiver section 123, a request-response sender section 124, and a data sender section 125.

The session control section 111 employed in the session management section 81 is a unit for updating user-setting information stored in the user-information storage section 63 and updating cataloged-member information stored in the member-information storage section 113 in accordance with an operation signal received from the operation input section 31. In addition, the session control section 111 also sets members, with which a remote communication is to be started, in accordance with the cataloged-member information stored in the member-information storage section 113. In the following descriptions, the members, with which a remote communication is to be started, are each referred to as a session target member.

On the basis of a time measured by the standard-time measurement section 30 or pieces of information received from the operation input section 31, the user-information receiver section 122, and the request-response receiver section 123, the session control section 111 controls the transmission control section 112, the request-response sender section 124, and the data sender section 125 to carry out their respective processes.

Furthermore, the session control section 111 supplies user-disclosure information received from the user-information receiver section 122 as user-disclosure information transmitted by another communication apparatus 1 to the synthesis control section 84 for use in a synthesis process carried out by the audio/video synthesis section 26 in accordance with control executed by the synthesis control section 84 to synthesize characters and image according to the user-disclosure information with the image and sound of the content. The audio/video synthesis section 26 outputs a synthesis result process to the display unit 41.

On the basis of the cataloged-member information stored in the member-information storage section 113 and the user-setting information stored in the user-information storage section 63, the transmission control section 112 sets the configuration of the user-disclosure information to be transmitted to a session target member as information that can be disclosed to the member. Then, the transmission control section 112 controls the user-information sender section 121 to actually generate user-disclosure information on the basis of the configuration set by the transmission control section 112 and transmit the information to the session target member. At that time, in accordance with the configuration of the user-disclosure information, the transmission control section 112 also controls the signal-processing section 131 embedded in the user-information sender section 121 to acquire predetermined information from real-time data input by the input section 22 and carry out thinning and compression processes on an image included in the acquired information.

The member-information storage section 113 is used for storing information on members, which can each become a communication partner in a remote communication. The session control section 111 stores information on such members in advance in the member-information storage section 113 in accordance with an operation carried out by the user as information on cataloged members.

FIG. 7 is a diagram showing a typical configuration of the cataloged-member information stored in the member-information storage section 113. Information on a cataloged member includes the name of a user serving as the member, an attribute of the user, a private level of the user, and a contact address of the user. The attribute of a user (that is, the member) is a relation between the user and the user A. The private level of a user is the level of intimacy of the member in the relation with the user A. The example of the contact address is a URL (Uniform Resource Locator) and an email address.

The attribute is a set including a plurality of users allowed to participate in the same remote communication. The set can be a family, a group of friends or a circle to mention a few. The lower the private level, the higher the level of intimacy. For example, a private level of 1 represents an intimacy level higher than a private level of 3.

That is to say, a user, the name of which is User X, has a family attribute in the communication apparatus 1 and a private level set at 1 in the family attribute. The contact address of User X is 050***. A user, the name of which is User Y, also has a family attribute in the communication apparatus 1 and a private level set at 2 in the family attribute. The contact address of User Y is 011-1*. A user, the name of which is User Z, has a friend attribute in the communication apparatus 1 and has a private level set at 4 in the friend attribute. The contact address of User Z is abc@de.fg.

A user, the name of which is Group 1, has a university attribute in the communication apparatus 1 and a private level set at 5 in the university attribute. The contact address of Group 1 is Member.. A user, the name of which is Group 2, has a hobby attribute in the communication apparatus 1 and a private level set at 3 in the hobby attribute. The contact address of Group 2 is *.

As described above, users are classified in the communication apparatus 1 into attributes and users having the same attribute are further classified in accordance with their private levels each indicating the level of intimacy in the attribute. In this case, the user A operating the communication apparatus 1 can designate another user as a session target member by selecting a user name, an attribute, or a combination of an attribute and a private level.

Let us assume for example that the user A operating the communication apparatus 1 designates another user as a session target member by selecting a combination of the family attribute and a private level of at least 2. In this case, in the example shown in FIG. 7, User X having a family attribute in the communication apparatus 1 and a private level set at 1 in the family attribute as well as User Y also having a family attribute in the communication apparatus 1 and a private level set at 2 in the family attribute are each designated as a session target member. If the user A designates another user as a session target member by selecting a combination of the family attribute and a private level of at least 1, on the other hand, User Y having a family attribute in the communication apparatus 1 and a private level set at 2 will not be designated as a session target member.

It is to be noted an attribute and private level used by the user A as information for designating another user as a session target member are stored in user-setting information to be described later by referring to FIG. 8 as user-setting information for the user A.

Refer back to FIG. 6. In accordance with control executed by the transmission control section 112 and on the basis of a configuration set as described above, the user-information sender section 121 employed in the communication section 23 generates user-disclosure information from the user-setting information stored in the user-information storage section 63 or real-time data and transmits the generated user-disclosure information to a session target member. At that time, in accordance with the configuration of the user-disclosure information, the signal-processing section 131 embedded in the user-information sender section 121 is controlled to acquire predetermined information from real-time data input by the input section 22 and carry out thinning and compression processes on an image included in the acquired information in order to generate the user-disclosure information.

The signal-processing section 131 is a unit for acquiring information such as an image, a voice, information on brightness, or a temperature from real-time data input by the input section 22 as real-time data of the user and supplying the acquired information to the user-information sender section 121. In addition, the signal-processing section 131 carries out thinning and compression processes on the acquired image and supplies the result of the processes to the user-information sender section 121.

The user-information receiver section 122 is a unit for supplying user-disclosure information of the user X from another communication apparatus 1 to the session control section 111.

The request-response receiver section 123 is a unit for receiving a response signal from a session target member such as the communication apparatus 1-2 and supplying the response signal to the session control section 111. The response signal is transmitted from a session target member in response to a signal making a request for a start of a remote communication or a request signal transmitted by the request-response sender section 124.

The request-response sender section 124 is a unit for transmitting a signal making a request for a start of a remote communication and a response signal to a session target member in accordance with control executed by the session control section 111. The request-response sender section 124 transmits the response signal in response to a request signal received by the request-response receiver section 123 as a signal making a request for a start of a remote communication.

The data sender section 125 includes a sender section 132 and a receiver section 133. In accordance with control executed by the session control section 111, the data sender section 125 exchanges signals with another communication apparatus consenting to a remote-communication start requested by the communication apparatus 1-1, establishes a connection with the other communication apparatus, and exchanges real-time data as well as other information with the other communication apparatus, with which the connection has been established, after the establishment of the connection. The other information exchanged with the other communication apparatus includes data requested in communications with the other communication apparatus and reproduction of a content synchronously with the other communication apparatus.

FIG. 8 is a diagram showing a typical configuration of the aforementioned user-setting information stored in the user-information storage section 63.

In the typical configuration shown in FIG. 8, the user-setting information includes a user name of User A, utilization status of ON, a content name of CS121ch, an attribute of "family", a private level of a value equal to or greater than 2, and a disclosure level of a value equal to or greater than 1. The content name, attribute, private level, and disclosure level included in the user-setting information are information set in advance by the user, the name of which is User A.

The user name is the name of a user operating the communication apparatus 1. It is to be noted that, if a plurality of users utilize the same communication apparatus 1, a name can be given to each of the users. The utilization status is status as to whether or not the user, the name of which is indicated by the user name, is operating the communication apparatus 1.

The content name is the name of a content being reproduced (or utilized) in the communication apparatus 1 by the user, the name of which is indicated by the user name, or the name of a content with reproduction thereof desired by the user. If the content is a program content of BS (Broadcast Satellite) broadcasting, a program content of CS (Communication Satellite) broadcasting, or a program content of ground-wave digital broadcasting, the name of a channel for broadcasting the content is appended in the content name. If the content is stored in the content storage section 61 or read out from a recording medium such as an optical disk or the like not shown in the figure, on the other hand, a name given to the content, the title of the optical disk or another name is set in the content name.

The attribute and the private level are data extracted from the cataloged-member information stored in the communication apparatus 1 as information on a session target member set by the user, the name of which is indicated by the user name. The disclosure level is the level of a cataloged session target member to which information acquirable in the communication apparatus 1 can be disclosed as user-disclosure information. An example of information that can be disclosed to such a session target member is this user-setting information itself.

That is to say, in the case of the example shown in FIG. 8, in the communication apparatus 1 with utilization status of ON indicating that the communication apparatus 1 is being operated by a user, the name of which is User A, a content name having a content name of CS121ch is being reproduced. In addition, User A has set a start of a remote communication with a user designated as a session target member with an attribute of "family" and a private level of at least 2 or a private level of 1 or 2. Then, in a process to start a remote communication, the disclosure level set in this user-setting information is used as a criterion as to whether or not information acquirable in the communication apparatus 1 can be disclosed as user-disclosure information to users each serving as a session target member having a private level of 1 or 2 and an attribute of "family". Since the disclosure level is set at a value of 2 or greater in this user-setting information, the acquirable information including this user-setting information can be disclosed as user-disclosure information to a session target member having a private level of 1.

Examples of information that can be disclosed as user-disclosure information are the number of users utilizing (or viewing a content in) the communication apparatus 1 together, information displayable by a thumbnail picture, information on an environment surrounding the user viewing the content, information on the condition of the user, the form of the communication desired by the user, and information on the state of the remote communication. The information on an environment surrounding the user viewing the content can normally be entered through the input section 22. The information on an environment surrounding the user viewing the content includes the image, brightness, and temperature of the room in which the communication apparatus 1 is installed. The information on the condition of the user indicates for example that the user is in the middle of a meal, having a visitor, or having a coffee break. The form of the communication desired by the user may indicate a communication of voices only or a communication of images only. The information on the state of the remote communication generally reveals a person with which the user is presently communicating.

If the disclosure level in user-setting information is set at "All", for example, the information acquirable in the communication apparatus 1 can be displayed to session target members of all private levels as user-disclosure information. For example, the number of users utilizing (or viewing a content in) the communication apparatus 1 together can be disclosed to session target members of all private levels as user-disclosure information. By the same token, information displayable by a thumbnail picture can be disclosed to session target members of all private levels as user-disclosure information.

As described above, however, the information on the state of the remote communication reveals a person serving as a communication partner. Thus, the private level set in the user-setting information of the communication partner as the private level of session target members of the communication partner is also involved. In consequence, in order to define the range of session target members in the user-setting information of a user as the range of session target members to whom the information on the user is to be disclosed, it is necessary not only to determine the disclosure level of the user, but also to consider the attribute, private level, and even disclosure level set in the user-setting information of the communication partner with which the user is presently communicating. By taking the attribute, private level, and even disclosure level set in the user-setting information of the communication partner into consideration, it is possible to issue a permission to disclose the fact that a communication with the communication partner is going on but issue no permission to disclose information on the communication partner.

In addition, depending on the disclosure level, instead of transmitting a user thumbnail stored as user-setting information, an image included in real-time data input by the input section 22 as an image of the user can be transmitted as it is, transmitted in a frame transmission at a low frame rate or transmitted after being compressed to be disclosed to a session target member as detailed information of the user. In the case, the user Y also uses the communication apparatus 1-2 with the user X.

Next, the remote-communication start process carried out at the step S1 of the flowchart shown in FIG. 5 is explained by referring to a flowchart shown in FIG. 9. The flowchart shown in FIG. 9 represents processing carried out by the communication apparatus 1-1 operated by the user A to start a remote communication with the communication apparatus 1-2 operated by the user X.

First of all, the user A operates the operation input section 31 to activate the communication apparatus 1-1. Then, in accordance with an operation signal generated by the operation input section 31, the control section 32 turns on a power supply for the whole of the communication apparatus 1-1.

Subsequently, the user A operates the operation input section 31 to enter a command making a request for a start of a remote communication between the communication apparatus 1-1 and the communication apparatus 1-2 operated by the user X. Then, the user A operates the operation input section 31 to enter a command of designating each user, for example, having an attribute of family and a private level of values at least equal to 2 as a session target member for the user A operating the communication apparatus 1-1. Such session target members include the user X. The operation input section 31 generates operation signals corresponding to these commands and supplies the signals to the session control section 111.

Receiving the operation signals from the operation input section 31, in a process carried out at the first step S21 of the flowchart shown in FIG. 9, the session control section 111 stores user-setting information in the user-information storage section 63. The user-setting information includes User A as the user name, utilization status revealing the use of the communication apparatus 1-1 by the user A, the family attribute cited above, and the aforementioned private level set at a value of 2 or greater. The family attribute and the private level are information used for defining session target members of the communication apparatus 1-1 operated by the user A.

Then, the user A selects a content having rights such as a copyright as a content to be viewed or executed. An example of such a content is a content with a content name of CS121ch. Receiving the operation signals from the operation input section 31, in a process carried out at the next step S22, the session control section 111 selects a content specified by one of the operation signals and stores the name of the selected content in the user-information storage section 63 as a portion of the user-setting information. In addition, at that time, the session control section 111 supplies information on the selected content to the reproduction permission section 85 to control the content reproduction section 25 so as to reproduce the selected content. Then, the flow of the processing goes on to a step S23.

To put it in detail, on the basis of information such as a license and privacy of the selected content or the a channel for transmitting the content, the reproduction permission section 85 produces a determination result as to whether or not reproduction of the content is permitted and, if the determination result reveals a permission of the reproduction of the content, the reproduction permission section 85 controls the content reproduction section 25 to reproduce the content. The content reproduction section 25 reproduces the content of a broadcast program received by the broadcast receiver section 24 and outputs an image and sound of the reproduced content to the audio/video synthesis section 26. In turn, the audio/video synthesis section 26 outputs video and audio signals representing images and sounds received from the content reproduction section 25 as the image of the content to the output section 21.

Figure 10:
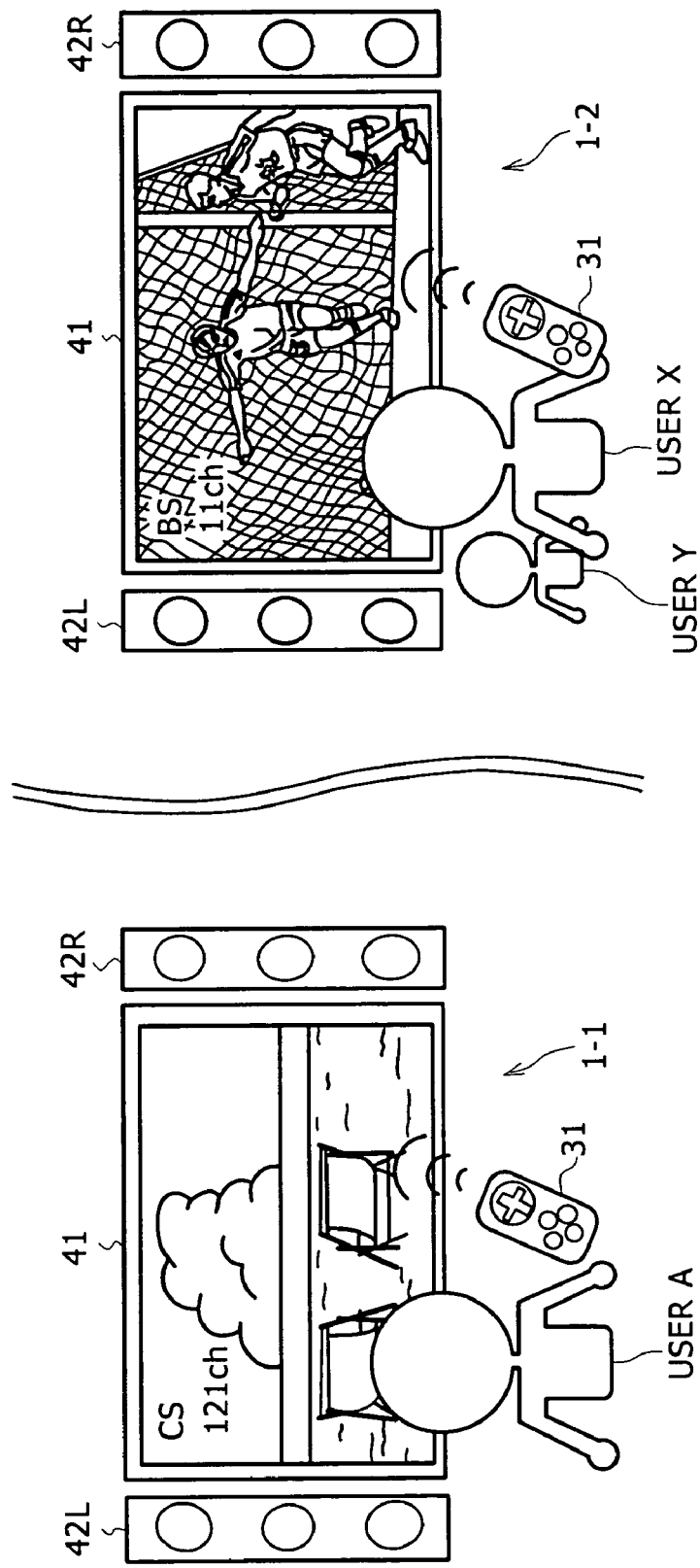
FIG. 10 is an explanatory diagram showing a content displayed in a process carried out at a step S22 of the flowchart shown in FIG. 9.

Thus, as shown in FIG. 10, the display unit 41 employed in the communication apparatus 1-1 operated by the user A shows the image of the CS121ch content selected and reproduced in accordance with an operation carried out by the user A on a remote controller serving as the operation input section 31. At the same time, the sound of the CS121ch content is output from speakers 42R and 42L installed at both the sides of the display unit 41.

In the mean time, the communication apparatus 1-2 located at a location remote from the communication apparatus 1-1 as a communication apparatus operated by the users X and Y each serving as a session target member also carries out similar processing to be described later by referring to a flowchart shown in FIG. 13. Also as shown in FIG. 10, the display unit 41 employed in the communication apparatus 1-2 shows the image of the BS11ch content selected and reproduced in accordance with an operation carried out by the user X on a remote controller serving as the operation input section 31. At the same time, the sound of the BS11ch content is output from speakers 42R and 42L installed at both the sides of the display unit 41.

In a process carried out at the step S23, the session control section 111 controls the transmission control section 112 to set user-disclosure information of the user A as information to be transmitted to the session target members.

To put it concretely, in the process carried out at the step S23, the transmission control section 112 sets user-disclosure information of the user A as user-disclosure information including user-setting information, the disclosure of which is permitted, on the basis of the disclosure level of the user-setting information like the one shown in FIG. 8. Then, the flow of the processing goes on to a step S24. Later on, in a process carried out at the step S24, the transmission control section 112 controls the user-information sender section 121 to generate the set user-disclosure information of the user A and transmit the generated user-disclosure information to contact addresses included in the cataloged-member information shown in FIG. 7 as contact addresses of the session target members. Then, the flow of the processing goes on to a step S25.

In the mean time, also in the same way as the communication apparatus 1-1, in the communication apparatus 1-2 installed at a location remote from the communication apparatus 1-1 as an apparatus operated by the user X serving as one of the session target members, a selected content is reproduced. Later on, the user X sets user-disclosure information and, at a step S54 of a flowchart to be described later by referring to FIG. 13, the user-disclosure information of the user X is transmitted to the communication apparatus 1-1 serving as a session target member of the communication apparatus 1-2.

In a process carried out at the step S25, the session control section 111 outputs a determination result as to whether or not user-disclosure information has been received from a session target member. If the determination result output by the session control section 111 in the process carried out at the step S25 indicates that user-disclosure information has not been received from a session target member, the flow of the processing goes back to the step S24 at which the transmission control section 112 again controls the user-information sender section 121 to generate the set user-disclosure information of the user A and transmit the generated user-disclosure information to the contact addresses of the session target members. Then, the subsequent process is repeated.

That is to say, due to a line failure and/or a change in a terminal condition, for example, the communication apparatus 1-1 may not correctly receive user-disclosure information from every communication apparatus 1 serving as a session target member. In this case, the user-disclosure information of the user A is transmitted to the contact addresses of the session target members a predetermined number of times. In addition, after the user-disclosure information of the user A has been transmitted to the contact addresses of the session target members a predetermined number of times, the user-disclosure information of the user A is again transmitted to the contact addresses of the session target members at predetermined intervals as long as the remote communication processing is not suspended in its course.

As the user-information receiver section 122 receives user-disclosure information from the communication apparatus 1-2, the user-information receiver section 122 passes on the user-disclosure information to the session control section 111. In this case, the determination result output by the session control section 111 in the process carried out at the step S25 indicates that user-disclosure information has been received from a session target member and, accordingly, the flow of the processing goes on to a step S26 at which the user-disclosure information of the user X is supplied to the synthesis control section 84 to be output to the output section 21 eventually.

That is to say, in a process carried out at the step S26, the synthesis control section 84 controls the audio/video synthesis section 26 to synthesize characters and image or voice according to the user-disclosure information received from the session control section 111 with the image and sound of the content. Then, the audio/video synthesis section 26 displays an image represented by a video signal obtained as a synthesis result on the display unit 41 and output a sound represented by an audio signal obtained as a synthesis result to the speakers 42. In this way, as shown in FIG. 11, the display unit 41 shows a user selection screen displaying pieces of user-disclosure information received in the process carried out at the step S25 as pieces of user-disclosure information of users each serving as a session target member.

Figure 11:
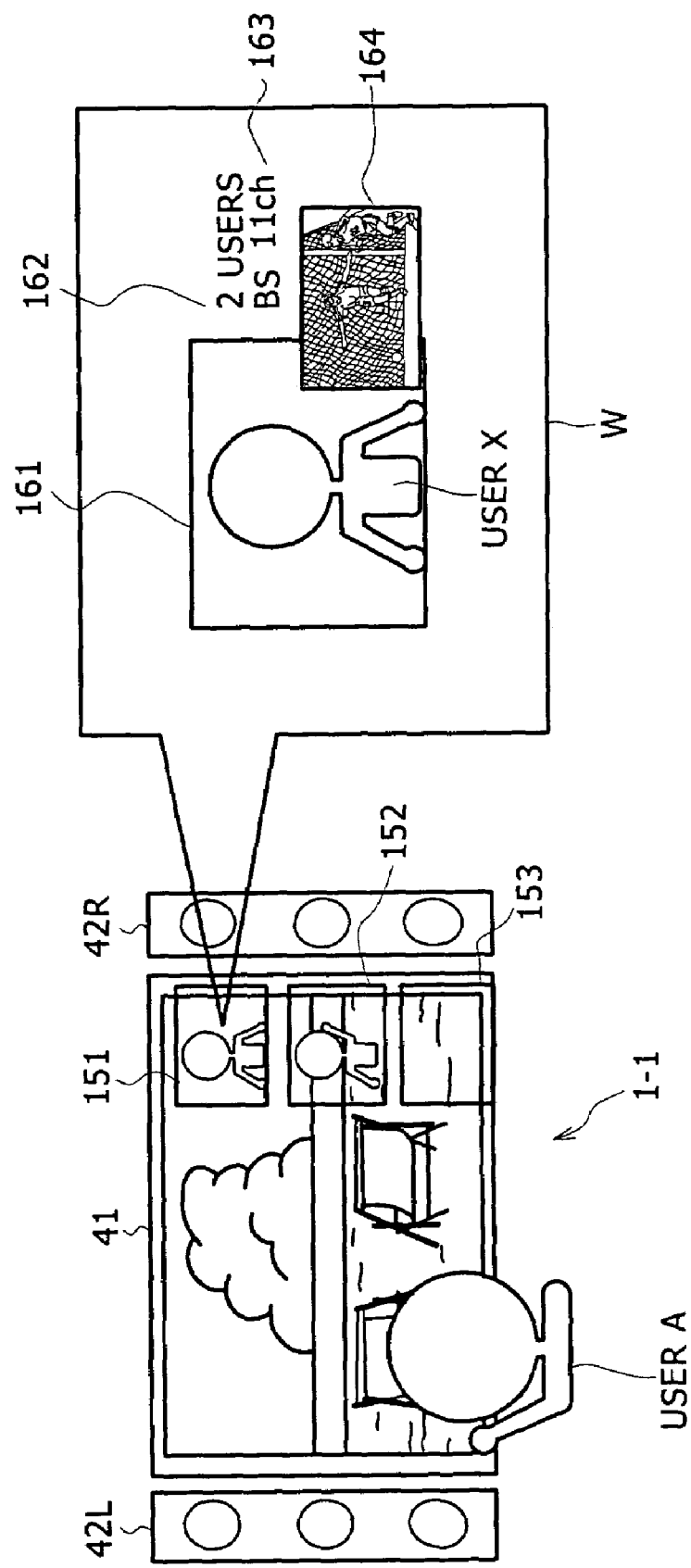
FIG. 11 is an explanatory diagram showing a typical user selection screen.

FIG. 11 is a diagram showing a typical user selection screen appearing on the display unit 41 employed by the communication apparatus 1-1 operated by the user A.

As shown in FIG. 11, the typical user selection screen appears on the display unit 41 on the right side of the image appearing on the display unit 41 shown in FIG. 10 as the image of the CS121ch content being reproduced. The user selection screen shows the pieces of user-disclosure information of users each serving as a session target member on subscreens 151 to 153 superposed on the image of the content.

For example, the subscreen 151 displays a thumbnail picture of the user X as the user-disclosure information of the user X serving as a session target member. By the same token, the subscreen 152 displays a thumbnail picture of another user, say, a user P, as the user-disclosure information of the other user P serving as another session target member. In the same way, the subscreen 153 is supposed to display a thumbnail picture of a further user, say, a user Q, as the user-disclosure information of the further user Q serving as a further session target member. Since the user Q is not using the communication apparatus 1 thereof or due to a communication failure or the like, in the process carried out at the step S25, the subscreen 153 does not display a thumbnail picture of the user Q. In the example shown in FIG. 11, the subscreen 153 displays nothing. It is to be noted that the subscreens 151 and 152 each display a thumbnail picture of a user on a background having a high degree of transparency so that portions of the image of the content behind the screens 151 and 152 are visible.

The subscreen 151 is explained in more detail by referring to a large window W, which will be obtained as a result of enlarging the subscreen 151, as follows. The subscreen 151 displays user-disclosure information set for a session target member and stored in the communication apparatus 1-2 as user-setting information of the user X. The user-disclosure information includes a thumbnail picture 161 of the user X, a user count 162 representing the number of users operating the communication apparatus 1-2, a content name 163 representing the name of a content being reproduced in the communication apparatus 1-2 as a content being viewed by the user X, and a content image 164. Let us assume that the user X and a user Y utilize the communication apparatus 1-2. In this case, the user count 162 is two. In this example, the name of a content being reproduced in the communication apparatus 1-2 is BS11ch.

That is to say, the user X allows the thumbnail picture 161, the user count 162, the content name 163, and the content image 164 to be disclosed to the user A. In other words, the thumbnail picture 161, the user count 162, the content name 163, and the content image 164 each have such a disclosure level that the thumbnail picture 161, the user count 162, the content name 163, and the content image 164 can be disclosed to the user A having a certain attribute and private level with respect to the user X. It is to be noted that the content image 164 can be displayed on the communication apparatus 1-1 only if the copyright of the content image 164 allows the content image 164 to be viewed by using the communication apparatus 1-1.

It is also worth noting that a sound represented by an audio signal obtained as a synthesis result is output from the speakers 42L and 42R shown in FIG. 11 even though the above description does not explain so.

While looking at the user selection screen having the configuration described above, the user A operates the signal-processing section 131 to select a user, a start of a remote communication with whom is to be requested. Let us assume that the user A selects the user X. Operated by the user A, the operation input section 31 supplies an operation signal representing the user-selecting operation carried out by the user A to the session control section 111.

Receiving the operation signal from the operation input section 31, in a process carried out at a step S27 of the flowchart shown in FIG. 9, the session control section 111 selects a target of the request for a start of a remote communication in accordance with the operation signal received from the operation input section 31. The target of the request for a start of a remote communication is referred to hereafter as a request target. Then, the session control section 111 controls the request-response sender section 124 to transmit a signal making the request for a start of a remote communication to the selected request target, which is the communication apparatus 1-2 operated by the user X in this case.

Figure 12:
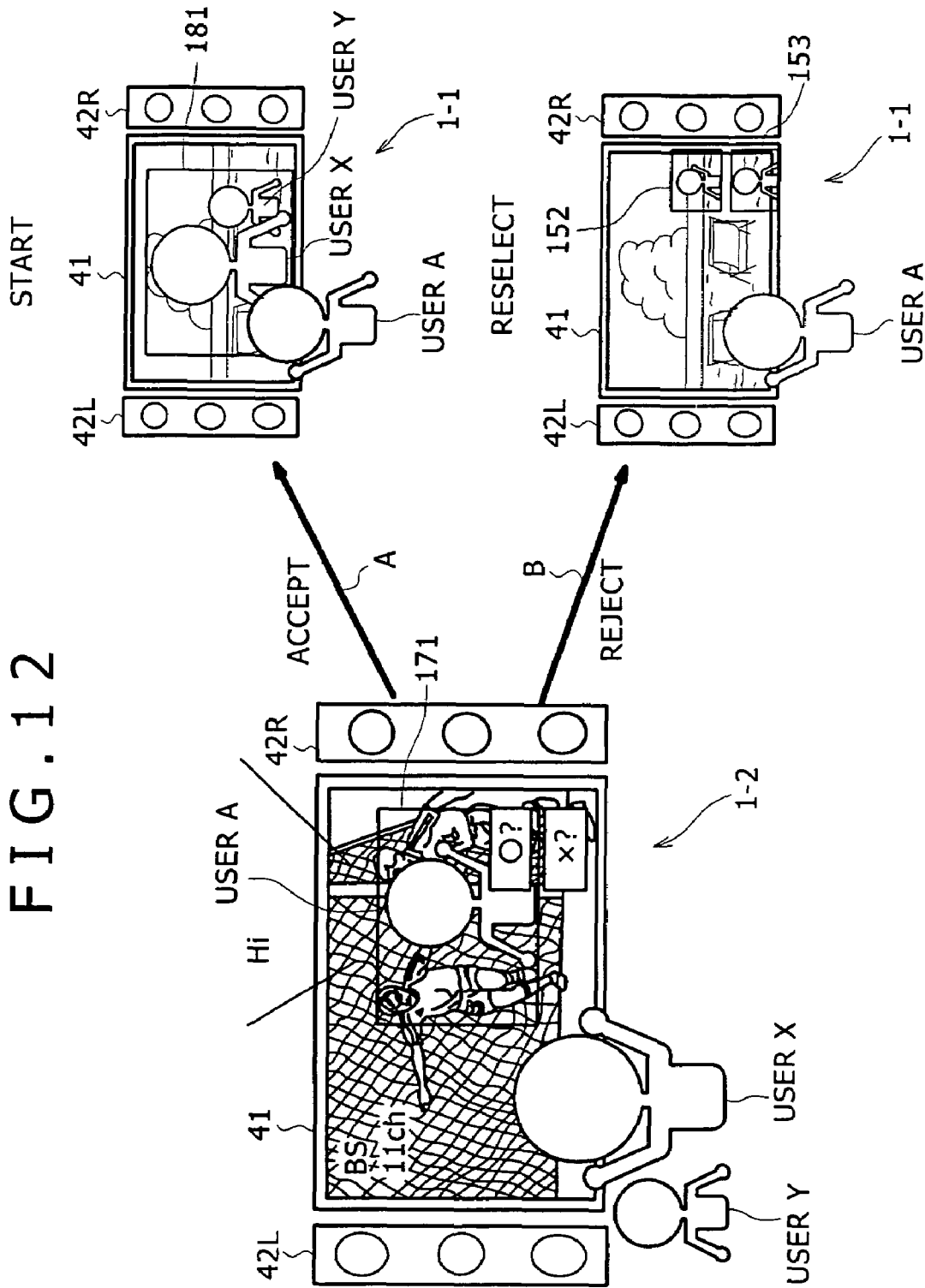
FIG. 12 is an explanatory diagram showing typical determination results produced in a process carried out at a step S28 of the flowchart shown in FIG. 9.

Receiving the signal making the request for a start of a remote communication, the communication apparatus 1-2 displays the user-disclosure information of the user A and the request for a start of a remote communication on the display unit 41 as shown in FIG. 12 as well as outputs a corresponding sound from the speakers 42 in a process carried out at a step S58 of the flowchart to be described later by referring to FIG. 13.

In an example shown in FIG. 12, the display unit 41 employed in the communication apparatus 1-2 utilized by the users X and Y shows the image of the BS11ch content appearing on the display unit 41 shown in FIG. 10 as a content being reproduced in the communication apparatus 1-2 and displays a subscreen 171 showing the user disclosure information of the user A on the right side of the content. In addition, the display unit 41 employed in the communication apparatus 1-2 also displays boxes superposed at the right lower corner of the image of the BS11ch content as boxes showing queries as to whether the request for a start of a remote communication is to be permitted or denied. To put it concretely, the boxes show a query of "O permitted?" and a query of "X denied". It is to be noted that, in the example shown in FIG. 12, the user-disclosure information displayed on the subscreen 171 includes a real-time image transmitted in a frame transmission as an image of the user A whereas the speakers 42L and 42R output a voice saying "Hello" as a real-time voice of the user A. It is also worth noting that the subscreen 171 displays the real-time image of the user A on a background with a high degree of transparency allowing the portion of the content image behind the subscreen 171 to be seen.

That is to say, in the example shown in FIG. 12, a real-time image transmitted in a frame transmission and displayed on the subscreen 171 as well as a real-time sound generated from the speakers 42L and 42R represent a request made by the user A to obtain a permission of a remote-communication start from the user X.

Looking at the information displayed on the subscreen 171 appearing on the display unit 41 employed in the communication apparatus 1-2 as the user-disclosure information of the user A and the queries as to whether the request for a start of a remote communication is to be permitted or denied, the user X operates the operation input section 31 to enter a response to the queries. Let us assume that the user X enters a response expressing acceptance of the request for a start of a remote communication. In a process carried out at a step S58 of the flowchart to be described later by referring to FIG. 13, the communication apparatus 1-2 transmits a response signal revealing the acceptance to the communication apparatus 1-1.

The request-response receiver section 123 employed in the communication apparatus 1-1 passes on the response signal received from the communication apparatus 1-2 to the session control section 111. In a process carried out at a step S28 of the flowchart shown in FIG. 9, the session control section 111 examines the response signal received from the request-response receiver section 123 to output a determination result as to whether or not the user X operating the communication apparatus 1-2 has accepted the request for a start of a remote communication. If the determination result indicates that the user X operating the communication apparatus 1-2 has accepted the request for a start of a remote communication, the flow of the processing goes on to a step S29 at which the session control section 111 controls the sender section 132 and the receiver section 133 to exchange connection signals with the communication apparatus 1-2 in order to establish a connection with the communication apparatus 1-2. Then, the session control section 111 updates the user-setting information stored in the user-information storage section 63 and, if necessary, the user-disclosure information in accordance with the updated user-setting information. Subsequently, the flow of the processing goes on to a step S30.

That is to say, the session control section 111 records remote-communication status indicating that a communication with the user X operating the communication apparatus 1-2 is going on in the user-setting information. Then, the session control section 111 controls the transmission control section 112 to update the user-disclosure information in accordance with the updated user-setting information.

It is to be noted that, in the establishment of the connection with the communication apparatus 1-2, from the communication apparatus 1-2, the communication apparatus 1-1 gets confirmation as to whether or not the user-disclosure information of the user X can be disclosed to session target members set in the communication apparatus 1-1 and, in dependence on the confirmation, the user-disclosure information may be updated. The confirmation of the fact that the user-disclosure information of the user X can be disclosed to session target members allows the user-disclosure information of the user X to be disclosed as the user-disclosure information of the partner of a remote communication in the disclosure of status of the remote communication between the user A and the user X to the session target members. By the same token, the communication apparatus 1-2 also carries out similar processing on the user-disclosure information of the user A.

Then, in a process carried out at the next step S30, the session control section 111 controls the transmission control section 112 to transmit the updated user-disclosure information to the session target members before terminating the remote-communication start processing. It is to be noted that, at that time, it is not necessary to transmit the updated user-disclosure information to the user X, the connection to which has been established.

Later on, the flow of the processing goes back to the step S2 included in the flowchart shown in FIG. 5 as a step following the step S1. In a process carried out at the step S2, the session control section 111 controls the input section 22 and the sender section 132 to start transmitting real-time data input by the input section 22 as real-time data of the user A and other users to the communication apparatus 1-2 by way of the communication network 2. In addition, the session control section 111 controls the receiver section 133 to start receiving real-time data transmitted by the communication apparatus 1-2 as real-time data of the users X and Y.

Then, an image and voice included in the real-time data of the user X as well as an image and voice included in the real-time data of the user Y are supplied to the audio/video synthesis section 26. Subsequently, in accordance with control executed by the synthesis control section 84, the audio/video synthesis section 26 synthesizes the image and voice included in the real-time data of the user X as well as the image and voice included in the real-time data of the user Y with the image and sound of the CS121ch content to output video and audio signals as a synthesis result to the output section 21. Thus, as shown by an arrow A in FIG. 12, the display unit 41 employed in the communication apparatus 1-1 shows an image appearing on the display unit 41 shown in FIG. 10 as the image of the CS121ch content being reproduced and a subscreen 181 superposed on the image as a subscreen showing images included in the real-time data of the users X and Y as the images of the users X and Y in a process to start a remote communication. It is to be noted that, also in this case, the subscreen 181 displays the real-time images of the users X and Y on a background with a high degree of transparency allowing the portion of the content image under the subscreen 181 to be seen.

If the determination result produced by the session control section 111 in the process carried out at the step S28 shows that the response signal received from the request-response receiver section 123 indicates that the user X operating the communication apparatus 1-2 has turned down (not accepted) the request for a start of a remote communication, on the other hand, the flow of the processing goes back to the step S24 at which the transmission control section 112 again controls the user-information sender section 121 to generate the set user-disclosure information of the user A and transmit the generated user-disclosure information to the contact address of the session target member. In response to the transmitted user-disclosure information, the communication apparatus 1-1 again receives user-disclosure information from the session target member. Then, in a process carried out at the step S26, the received user-disclosure information is supplied to the synthesis control section 84 to be output to the output section 21 and displayed on the display unit 41 eventually.

That is to say, if the user X turns down the request for a start of a remote communication, as shown by an arrow B in FIG. 12, the display unit 41 employed in the communication apparatus 1-1 shows the subscreens 152 and 153 on the right side of the image of the CS121ch content being reproduced as subscreens superposed on the CS121ch-content image, which is shown in FIG. 11.

In the case of the example shown in FIG. 12, the subscreen 151 appearing on the user selection screen shown in FIG. 11 as a screen showing the user-disclosure information of the user X is not displayed anymore because the user X has turned down the request for a start of a remote communication. In the same way as the example shown in FIG. 11, however, the subscreen 152 shows the thumbnail picture of another user serving as another session target member as user-disclosure information of the other user. By the same token, the subscreen 153 shows the thumbnail picture of a further user serving as a further session target member as user-disclosure information of the further user. The thumbnail picture of the further user is a picture received at the step S25. In this example, the other and further users are the users P and Q respectively.

In this way, the processes of the step S24 and the subsequent steps are carried out repeatedly as long as the remote communication processing is not suspended in its course.

Figure 13:
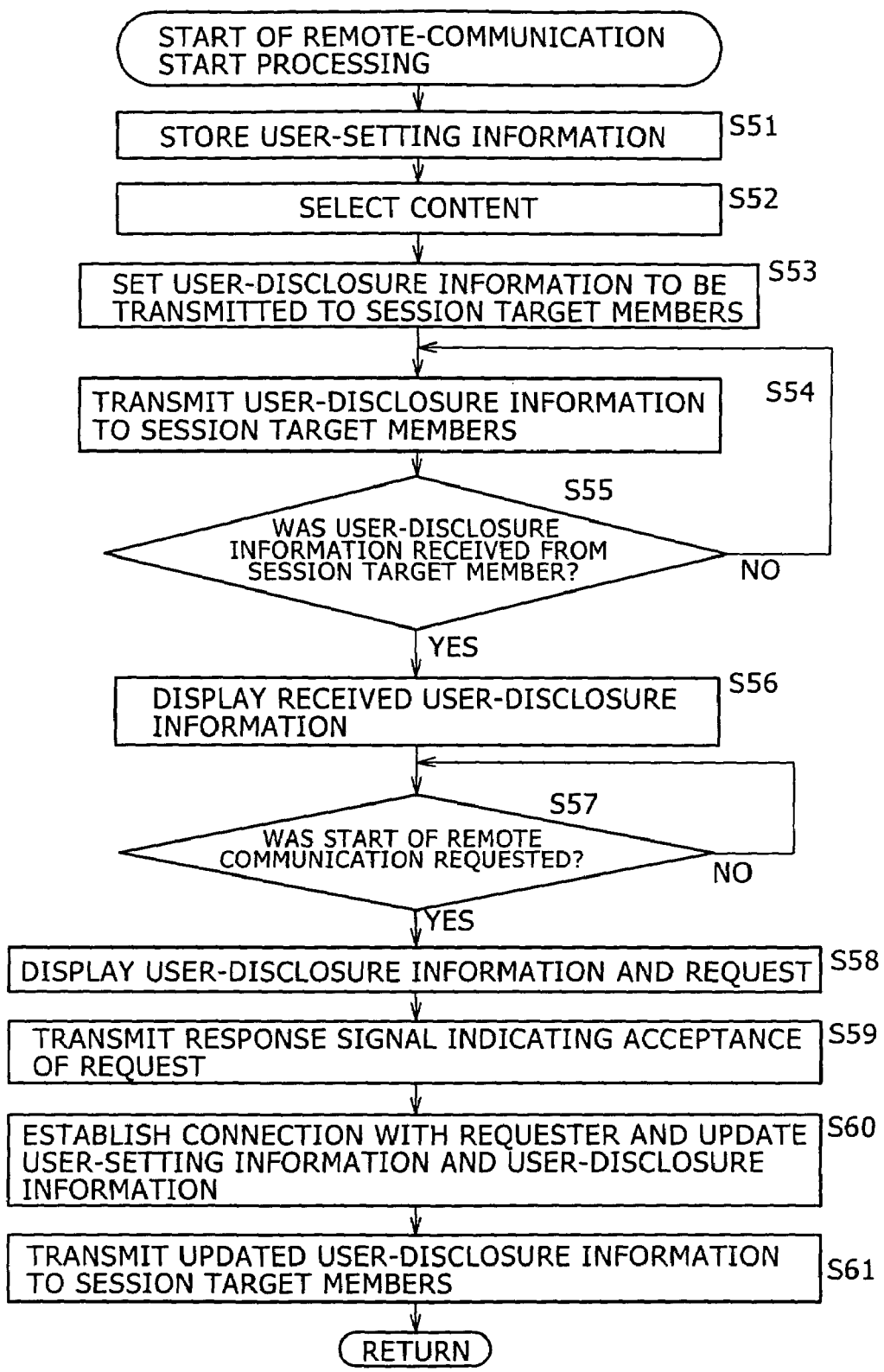
FIG. 13 shows a flowchart referred to in explanation of counterpart processing of the remote-communication start processing represented by the flowchart shown in FIG. 9.

Next, by referring to a flowchart shown in FIG. 13, the following description explains remote-communication start processing carried out by the communication apparatus 1-2 as a counterpart of the remote-communication start processing carried out by the communication apparatus 1-2 in accordance with the flowchart shown in FIG. 9. It is to be noted that, in the typical remote-communication start processing represented by the flowchart shown in FIG. 13, the communication apparatus 1-2 is activated in the same way as the communication apparatus 1-1 to start a remote communication. Thus, processes carried out at the steps S51 to S56 as well as S60 and S61 of the flowchart shown in FIG. 13 are basically identical with the processes carried out at respectively the steps S21 to S26 as well as S29 and S30 of the flowchart shown in FIG. 9. For this reason, these identical processes are no longer explained in detail to properly avoid duplications.

First of all, the user X operates the operation input section 31 to activate the communication apparatus 1-2. Then, in accordance with an operation signal generated by the operation input section 31, the control section 32 turns on a power supply for the whole of the communication apparatus 1-2.

Subsequently, the user X operates the operation input section 31 to enter a command making a request for a start of a remote communication between the communication apparatus 1-1 operated by the user A and the communication apparatus 1-2 utilized by the users X and Y at the same time. Then, the user X operates the operation input section 31 to enter a command of designating users each for example having an attribute and a private level as a session target member for the user X. The operation input section 31 generates operation signals corresponding to these commands and supplies the signals to the session control section 111.

Receiving the operation signals from the operation input section 31, in a process carried out at the first step S51 of the flowchart shown in FIG. 13, the session control section 111 stores user-setting information in the user-information storage section 63. The user-setting information includes user names, utilization status revealing the use of the communication apparatus 1-2 by the users X and Y, the attribute cited above, and the aforementioned private level. The attribute and the private level are information used for defining session target members of the communication apparatus 1-2 operated by the users X and Y.

Then, the user X selects a content having rights such as a copyright as a content to be viewed or executed. An example of such a content is a content with a content name of BS11ch. Receiving the operation signals from the operation input section 31, in a process carried out at the next step S52, the session control section 111 selects a content specified by one of the operation signals and stores the name of the selected content in the user-information storage section 63 as a portion of the user-setting information. In addition, at that time, the session control section 111 supplies information on the selected content to the reproduction permission section 85 to control the content reproduction section 25 so as to reproduce the selected content. Then, the flow of the processing goes on to a step S53.

Thus, as described earlier by referring to FIG. 10, the display unit 41 employed in the communication apparatus 1-2 operated by the users X and Y shows the image of the BA11ch content selected and reproduced by an operation carried out by the user X on a remote controller serving as the operation input section 31. At the same time, the sound of the BS11ch content is output from speakers 42R and 42L installed at both the sides of the display unit 41.

In a process carried out at the step S53, the session control section 111 controls the transmission control section 112 to set user-disclosure information of the user X as information to be transmitted to the session target members. Then, the flow of the processing goes on to a step S54. In a process carried out at the step S54, the transmission control section 112 controls the user-information sender section 121 to generate the set user-disclosure information of the user X and transmit the generated user-disclosure information to contact addresses of the session target members. Then, the flow of the processing goes on to a step S55.

In the mean time, also in the communication apparatus 1-1 installed at a location remote from the communication apparatus 1-1 as an apparatus operated by the user A serving as one of the session target members, a selected content is reproduced. Later on, the user A sets user-disclosure information and, at the step S24 of the flowchart shown in FIG. 9, the generated user-disclosure information of the user A is transmitted to the communication apparatus 1-2 serving as a session target member of the communication apparatus 1-1.

In a process carried out at the step S55, the session control section 111 outputs a determination result as to whether or not user-disclosure information has been received from a session target member. If the determination result output by the session control section 111 in the process carried out at the step S55 indicates that user-disclosure information has not been received from a session target member, the flow of the processing goes back to the step S54 at which the transmission control section 112 again controls the user-information sender section 121 to generate the set user-disclosure information of the user X and transmit the generated user-disclosure information to the contact addresses of the session target members. Then, the subsequent process is repeated.

As the user-information receiver section 122 receives user-disclosure information of the user A from the communication apparatus 1-1, the user-information receiver section 122 passes on the user-disclosure information to the session control section 111. In this case, the determination result output by the session control section 111 in the process carried out at the step S55 indicates that user-disclosure information has been received from a session target member and, accordingly, the flow of the processing goes on to a step S56 at which the user-disclosure information of the user A is supplied to the synthesis control section 84 to be output to the output section 21 eventually. Thus, user-disclosure information received in a process carried out at the step S55 as user-disclosure information of a user serving as a session target member is displayed on a user selection screen appearing on the display unit 41, and the speakers 42 output the voice of the user. Then, the flow of the processing goes on to a step S57.

At that time, the display unit 41 employed in the communication apparatus 1-1 shows the user-disclosure information of the user X and other users. Then, in the process carried out at the step S27 of the flowchart shown in FIG. 9, on the basis of an operation carried out by the user A, the communication apparatus 1-1 transmits a signal making a request for a start of a remote communication to the communication apparatus 1-2.

In the case of the typical remote-communication start processing represented by the flowchart shown in FIG. 13, the session control section 111 carries out a process to wait for a request for a start of a remote communication to be made by a session target member at the step S57. This process is carried out repeatedly in a wait state until a request for a start of a remote communication is made by a session target member. As the user-information receiver section 122 receives a signal making a request for a start of a remote communication from the communication apparatus 1-1, the user-information receiver section 122 passes on the signal to the session control section 111. In a process carried out at the step S57, the session control section 111 examines the response signal received from the user-information receiver section 122 to confirm that a request for a start of a remote communication has been made by a session target member. In this case, the flow of the processing goes on to a step S58 at which the user-disclosure information of the user A and information indicating the request for a start of a remote communication are supplied to the synthesis control section 84 to be output to the output section 21 eventually.

That is to say, in a process carried out at the step S58, the synthesis control section 84 controls the audio/video synthesis section 26 to synthesize characters and image or voice according to the user-disclosure information received from the session control section 111 and according to the information showing the request with the image and sound of the content. Then, the audio/video synthesis section 26 displays an image represented by a video signal obtained as a synthesis result on the display unit 41 and output a sound represented by an audio signal obtained as a synthesis result to the speakers 42. In this way, as described earlier by referring to FIG. 12, the display unit 41 employed in the communication apparatus 1-2 shows a subscreen 171 displaying the user-disclosure information of the user A and queries as to whether the request for a start of a remote communication is to be permitted or denied as a subscreen superposed on the right side of the image of the BS11ch content.

Looking at the information displayed on the subscreen 171 appearing on the display unit 41 employed in the communication apparatus 1-2 as the user-disclosure information of the user A and the queries as to whether the request for a start of a remote communication is to be permitted or denied, the user X operates the operation input section 31 to enter a response to the queries. Let us assume that the user X enters a response expressing acceptance of the request for a start of a remote communication. In this case, the operation input section 31 supplies an operation signal representing the acceptance of the request for a start of a remote communication to the session control section 111.

Receiving the operation signal from the operation input section 31, in a process carried out at the next step S59, the session control section 111 controls the request-response sender section 124 to transmit a response signal revealing the acceptance of the request for a start of a remote communication to the communication apparatus 1-1. The flow of the processing then goes on to a step S60.

In a process carried out at the step S60, the session control section 111 controls the sender section 132 and the receiver section 133 to exchange connection signals with the communication apparatus 1-1 in order to establish a connection with the communication apparatus 1-2. Then, the session control section 111 updates the user-setting information stored in the user-information storage section 63 and, if necessary, the user-disclosure information in accordance with the updating of the user-setting information. Subsequently, the flow of the processing goes on to a step S61. In a process carried out at the step S61, the session control section 111 controls the transmission control section 112 to transmit the updated user-disclosure information to the session target members before terminating the remote-communication start processing.

Later on, the flow of the processing goes back to the step S2 included in the flowchart shown in FIG. 5 as a step following the step S1. In a process carried out at the step S2, the session control section 111 controls the input section 22 and the sender section 132 to start transmitting real-time data input by the input section 22 as real-time data of the users X and Y to the communication apparatus 1-1 by way of the communication network 2. In addition, the session control section 111 controls the receiver section 133 to start receiving real-time data transmitted by the communication apparatus 1-1 as real-time data of the user A.

Then, an image and voice included in the real-time data of the user A are supplied to the audio/video synthesis section 26. Subsequently, in accordance with control executed by the synthesis control section 84, the audio/video synthesis section 26 synthesizes the image and voice included in the real-time data of the user A with an image and sound of the BS11ch content being reproduced to output video and audio signals as a synthesis result to the output section 21. Thus, the display unit 41 employed in the communication apparatus 1-2 shows an image appearing on the display unit 41 shown in FIG. 10 as the image of the BS11ch content being reproduced and a subscreen superposed on the image as a subscreen showing an image included in the real-time data of the user A as the image of the user A in a process to start a remote communication.

As described above, before an exchange of real-time data is actually started, user-disclosure information that can be disclosed to communication partners is exchanged with the partners. Then, after referring to received user-disclosure information, one of the communication apparatus requests another communication apparatus to start of a remote communication. Receiving the request for a start of a remote communication, the other communication apparatus refers to received user-disclosure information to accept the request before starting the remote communication. Thus, the communication apparatus on the requesting side is capable of making a request according to the condition, which can be recognized by referring to the user-disclosure information of the communication apparatus on the responding side as the condition of the communication apparatus on the responding side. As a result, a request can be made with a light heart. By the same token, the communication apparatus on the responding side is capable of giving a response to the request as a response according to the condition, which can be recognized by referring to the user-disclosure information of the communication apparatus on the requesting side as the condition of the communication apparatus on the requesting side. As a result, a response to a request can be given in a lighthearted manner without hesitation.

As described above, the user-disclosure information of a user may include a voice and image included in the real-time data of the user. It is to be noted, however, that between users mutually allowing the images of the real-time data to be looked at and the voices of the real-time data to be listened to, at a point of time the user-disclosure information is transmitted, the exchange of real-time data has been permitted before the real-time exchange is carried out and the remote communication is executed. That is to say, also in this case, prior to the actual exchange of real-time data, both sides permit the exchange of real-time data.

As explained above, a start of a remote communication between the communication apparatus 1-1 and 1-2 is permitted before the remote communication is started. After the remote-communication start processing described before by referring to the flowcharts shown in FIGS. 9 and 13 is carried out as processing to start a remote communication between the communication apparatus 1-1 and communication apparatus 1-2, however, another user serving as one of the set session target members is capable of participating in the remote communication between the communication apparatus 1-1 and communication apparatus 1-2.

Figure 14:
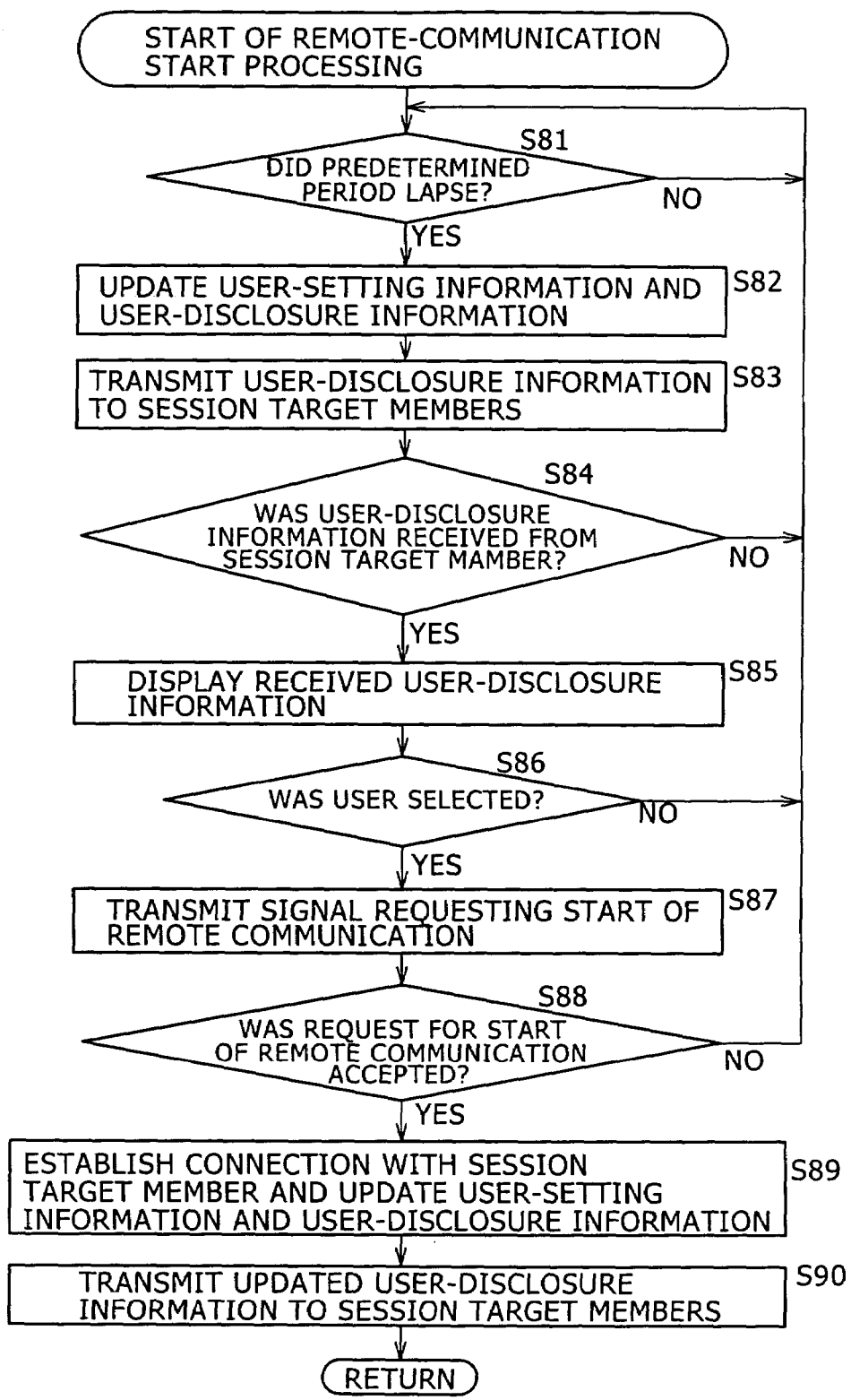
FIG. 14 shows a flowchart referred to in explanation of another implementation of the remote-communication start processing represented by the flowchart shown in FIG. 9.

Next, by referring to a flowchart shown in FIG. 14, the following description explains remote-communication start processing of the communication apparatus 1-1 already carrying out a remote communication with the communication apparatus 1-2.

That is to say, the remote-communication start processing represented by the flowchart shown in FIG. 14 is processing carried out by the communication apparatus 1-1 to start a remote communication with for example the communication apparatus 1-3 shown in none of the figures as a communication apparatus newly activated and utilized by the user P serving as one of the session target members of the communication apparatus 1-1 after the remote-communication start processing represented by the flowchart shown in FIG. 9 has been completed as processing to start a remote communication with the communication apparatus 1-2. It is to be noted that processes carried out in the remote-communication start processing represented by the flowchart shown in FIG. 14 as processes identical with their respective counterparts carried out in the remote-communication start processing represented by the flowchart shown in FIG. 9 are not described in detail anymore in order to properly avoid duplications.

At the first step S81 of the flowchart shown in FIG. 14, the session control section 111 enters a state of waiting for the lapse of a predetermined period of time measured on the basis of times generated by the standard-time measurement section 30. In this state, the session control section 111 repeatedly produces a determination result as to whether the predetermined period of time has lapsed. As the determination result indicates that the predetermined period of time has lapsed, the flow of the processing goes on to a step S82 at which the user-setting information stored in the user-information storage section 63 is updated and, in accordance with the updating of the user-setting information, the transmission control section 112 is controlled to update the user-disclosure information of the user A to be transmitted to session target members generated in a process carried out at the step S24 of the flowchart shown in FIG. 9 and updated in a process carried out at the step S29 of the same flowchart. Then, the flow of the processing goes on to a step S83.

In a process carried out at the step S83, the transmission control section 112 controls the user-information sender section 121 to transmit the updated user-disclosure information of the user A to contact addresses included in the cataloged-member information as the contact addresses of the session target members. Then, the flow of the processing goes on to a step S84. It is to be noted that the communication apparatus 1-2, a connection with which has been established, may be excluded from the session target members each serving as a recipient of the user-disclosure information of the user A.

In the mean time, in the same way as the remote-communication start processing carried out by the communication apparatus 1-2 as represented by the flowchart shown in FIG. 13, after being activated, the communication apparatus 1-3 provided at a location remote from the communication apparatus 1-1 as a communication apparatus operated by the user P serving as one of the session target members reproduces a selected content and gets the user-disclosure information of the user P. Then, the user-disclosure information of the user P is transmitted to the communication apparatus 1-1 operated by the user A serving as a session target member in the same process at the step S54 of the flowchart shown in FIG. 13.

In a process carried out at the step S84, the session control section 111 outputs a determination result as to whether or not user-disclosure information has been received from a session target member. If the determination result output by the session control section 111 in the process carried out at the step S84 indicates that user-disclosure information has not been received from a session target member, the flow of the processing goes back to the step S81 to repeat the processes carried out at this step and the subsequent steps.

If the determination result output by the session control section 111 in the process carried out at the step S84 indicates that user-disclosure information has been received from a session target member, on the other hand, the flow of the processing goes on to a step S85 at which the user-disclosure information, which is the user-disclosure information of the user P in this case, is supplied to the synthesis control section 84 to be output to the output section 21 eventually. Thus, user-disclosure information received in a process carried out at the step S84 as user-disclosure information of a user serving as a session target member is displayed on a user selection screen appearing on the display unit 41 and, if necessary, the speakers 42 output the voice of the user.

Looking at the information displayed on the user selection screen appearing on the display unit 41 employed in the communication apparatus 1-3 as pieces of user-disclosure information of users, the user A operates the operation input section 31 to select a one of the users. Let us assume that the user A selects the user P as a user allowed to newly participate in the remote communication. It is to be noted that, if the user A desires none of the users as a user to newly participate in the remote communication, the user A typically closes the user selection screen. The operation input section 31 supplies an operation signal representing the operation carried out by the user A to select the user P to the session control section 111.

Receiving the operation signal from the operation input section 31, in a process carried out at the next step S86, the session control section 111 examines the operation signal received from the operation input section 31 to input a determination result as to whether or not a user has been selected. If the determination result indicates that none of the users displayed on the user selection screen have been selected, that is, if the user A has closed the user selection screen, the flow of the processing goes back to the step S81 to repeat the processes carried out at this step and the subsequent steps.

If the determination result produced in the process carried out at the step S86 indicates that any one of the users displayed on the user selection screen has been selected, on the other hand, the processing goes on to a step S87 at which the session control section 111 controls the request-response sender section 124 to transmit a signal making a request for a start of a remote communication to the communication apparatus operated by the selected user. In this example, the communication apparatus operated by the selected user is the communication apparatus 1-3 operated by the user P.

In response to the signal received from the communication apparatus 1-1 as a signal making the request for a start of a remote communication, the communication apparatus 1-3 transmits a response signal expressing acceptance or rejection of the request to the communication apparatus 1-1 in the same process as the step S59 of the flowchart shown in FIG. 13.

The request-response receiver section 123 employed in the communication apparatus 1-1 passes on the response signal received from the communication apparatus 1-3 to the session control section 111. In a process carried out at the next step S88, the session control section 111 examines the response signal received from the request-response receiver section 123 to output a determination result as to whether the user P operating the communication apparatus 1-3 has accepted or turned down the request for a start of a remote communication. If the determination result indicates that the user P operating the communication apparatus 1-3 has turned down (or did not accept) the request for a start of a remote communication, the flow of the processing goes back to the step S81 to repeat the processes carried out at this step and the subsequent steps.

If the determination result produced at the step S88 indicates that the user P operating the communication apparatus 1-3 has accepted the request for a start of a remote communication, on the other hand, the flow of the processing goes on to a step S89 at which the session control section 111 controls the sender section 132 and the receiver section 133 to exchange connection signals with the communication apparatus 1-3 in order to establish a connection with the communication apparatus 1-3. Then, the session control section 111 updates the user-setting information stored in the user-information storage section 63 and controls the transmission control section 112 to update the user-disclosure information in accordance with the updated user-setting information. Then, the flow of the processing goes on to a step S90.

In a process carried out at the next step S90, the session control section 111 controls the transmission control section 112 to transmit the updated user-disclosure information to the session target members before terminating the remote-communication start processing.

Later on, the flow of the processing goes back to the step S1 included in the flowchart shown in FIG. 5 as a step following the step S2. In a process carried out at the step S2, the session control section 111 controls the input section 22 and the sender section 132 to start transmitting real-time data input by the input section 22 as real-time data of the user A and other users to the communication apparatus 1-3 by way of the communication network 2. In addition, the session control section 111 controls the receiver section 133 to start receiving real-time data transmitted by the communication apparatus 1-3 as real-time data of the user P.

Then, an image and voice included in the real-time data of the user P, an image and voice included in the real-time data of the user X as well as an image and voice included in the real-time data of the user Y are supplied to the audio/video synthesis section 26. Subsequently, in accordance with control executed by the synthesis control section 84, the audio/video synthesis section 26 synthesizes the image and voice included in the real-time data of the user P, the image and voice included in the real-time data of the user X, the image and voice included in the real-time data of the user Y with the image and sound of the CS121ch content being reproduced in order to output video and audio signals as a synthesis result to the output section 21. Thus, the display unit 41 employed in the communication apparatus 1-1 shows an image appearing on the display unit 41 shown in FIG. 10 as the image of the CS121ch content and a subscreen superposed on the image as a subscreen showing images included in the real-time data of the users X and Y as the images of the user P in a process to start a remote communication.

As described above, a communication apparatus 1-1 periodically transmits the user-disclosure information of the user A to session target members while a remote communication is being carried out. If the communication apparatus 1-1 receives user-disclosure information transmitted by a session target member in response to the user-disclosure information of the user A, the communication apparatus 1-1 displays the received user-disclosure information so that the user A is capable of making a decision as to whether or not to transmit a request for a start of a remote communication with the session target member transmitting the received user-disclosure information. Thus, another user who could not start a remote communication because the other user did not operate a communication apparatus at the time the user A started the remote communication is also capable of newly participate in the existing remote communication with a light heart in the course of the existing remote communication. The above features apply to not only the communication apparatus 1-1, but also any communication apparatus 1.

To put it concretely, for example, the communication apparatus 1-2 also carries out the remote-communication start processing represented by the flowchart shown in FIG. 14 as processing to start a remote with the communication apparatus 1-3. Thus, the communication apparatus 1-3 starts a remote communication also with the communication apparatus 1-2. Since the communication apparatus 1-3 permits each of remote communications with the communication apparatus 1-1 and 1-2, the communication apparatus 1-3 is capable of newly participating in the remote communication between the communication apparatus 1-1 and 1-2.

As described above, a user who could not start a remote communication because the user did not operate a communication apparatus at the time a session target member started the remote communication is also capable of newly participating in the existing remote communication with a light heart even in the course of the existing remote communication.

Figure 15:
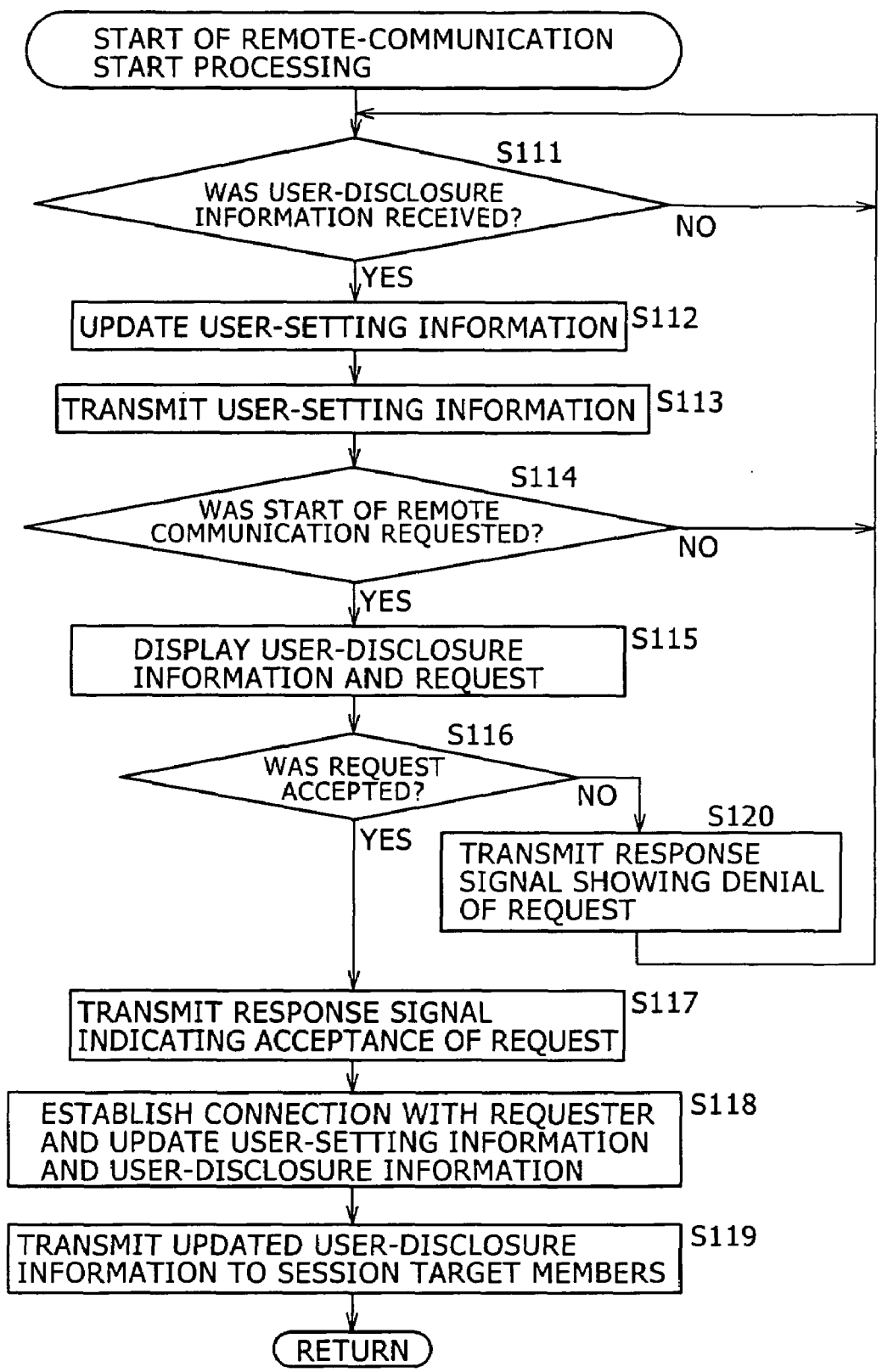
FIG. 15 shows a flowchart referred to in explanation of another implementation of the remote-communication start processing represented by the flowchart shown in FIG. 13.

Next, by referring to a flowchart shown in FIG. 15, the following description explains remote-communication start processing of the communication apparatus 1-2 already carrying out a remote communication with the communication apparatus 1-3. That is to say, the remote-communication start processing represented by the flowchart shown in FIG. 15 is processing carried out by the communication apparatus 1-2 to start a remote communication with the communication apparatus 1-1 as counterpart processing of the remote-communication start processing represented by the flowchart shown in FIG. 9. (As described above, the remote-communication start processing represented by the flowchart shown in FIG. 9 is processing carried out by the communication apparatus 1-1 to start a remote communication with the communication apparatus 1-2.) In other words, the remote-communication start processing represented by the flowchart shown in FIG. 15 is the same as the remote-communication start processing represented by the flowchart shown in FIG. 13 except that, in the case of FIG. 15, the communication apparatus 1-2 has completed processing to start a remote communication with the communication apparatus 1-3. It is to be noted that processes carried out in the remote-communication start processing represented by the flowchart shown in FIG. 15 as processes identical with their respective counterparts carried out in the remote-communication start processing represented by the flowchart shown in FIG. 13 are not described in detail anymore in order to properly avoid duplications.

That is to say, the communication apparatus 1-2 carries out the remote-communication start processing represented by the flowchart shown in FIG. 15 when the communication apparatus 1-1 is activated after the communication apparatus 1-2 has completed the remote-communication start processing represented by the flowchart shown in FIG. 13 as processing to start a remote communication with the communication apparatus 1-3 operated by the user P serving as a session target member. As described above, the communication apparatus 1-2 carries out the remote-communication start processing represented by the flowchart shown in FIG. 15 as counterpart processing of the remote-communication start processing represented by the flowchart shown in FIG. 9.

As explained earlier, when the communication apparatus 1-1 operated by the user A is activated, session target members of the user communication apparatus 1-1 are set, a selected content is reproduced, the user-disclosure information of the user A is generated and, in a process carried out at the step S24 of the flowchart shown in FIG. 9, the generated user-disclosure information is transmitted to the communication apparatus 1-2 serving as one of the session target members.

In a process carried out at the step S111, the session control section 111 enters a state of waiting for the user-information receiver section 122 to receive user-disclosure information of the user A from the communication apparatus 1-1. As the user-information receiver section 122 receives user-disclosure information of the user A from the communication apparatus 1-1, the flow of the processing goes on to a step S112 at which the session control section 111 controls the transmission control section 112 to verify that the session target member transmitting the user-disclosure information is a session target member in which the user-setting information of the user A has been set. Then, user-disclosure information generated at the step S54 of the flowchart shown in FIG. 13 and updated at the step S60 of the same flowchart as the user-disclosure information of the user X is re-updated. Subsequently, the flow of the processing goes on to a step S113.

It is to be noted that, if the session target member transmitting the user-disclosure information is not a session target member in which the user-setting information of the user A has been set, on the other hand, user-disclosure information to be transmitted as the user-disclosure information of the user X to a user transmitting the received user-disclosure information is newly generated. The newly generated user-disclosure information typically includes information revealing an incapability of transmitting a response due to the fact that the user X was communicating with another session target member.

Then, in a process carried out at the step S113, the transmission control section 112 controls the user-information sender section 121 to transmit the updated user-disclosure information of the user X to the user A operating the communication apparatus 1-1 transmitting the user-disclosure information of the user A in the process carried out at the step S111. Then, the flow of the processing goes on to a step S114.

The communication apparatus 1-1 receiving the user-disclosure information of the user X displays the user-disclosure information of the user X on the display unit 41. Then, on the basis of an operation carried out by the user A, in a process performed at the step S27 of the flowchart shown in FIG. 9, the communication apparatus 1-1 transmits a signal making a request for a start of a remote communication to the communication apparatus 1-2.

The user-information receiver section 122 employed in the communication apparatus 1-2 receives the signal making a request for a start of a remote communication from the communication apparatus 1-1 and supplies the signal to the session control section 111. In a process carried out at the step S114, the session control section 111 examines a signal received by the user-information receiver section 122 from the communication apparatus 1-1 serving as a session target member transmitting the user-disclosure information earlier to produce a determination result as to whether the signal is a signal making a request for a start of a remote communication. If the determination result produced in the process carried out at the step S114 indicates that a signal received by the user-information receiver section 122 from the communication apparatus 1-1 is not a signal making a request for a start of a remote communication, the flow of the processing goes back to the step S111 to repeat the processes of this step and the subsequent steps.

If the determination result produced in the process carried out at the step S114 indicates that a signal received by the user-information receiver section 122 from the communication apparatus 1-1 is a signal making a request for a start of a remote communication, on the other hand, the flow of the processing goes on to a step S115 at which the information indicating the request for a start of a remote communication and the user-disclosure information of the user A are supplied to the synthesis control section 84 to be output to the display unit 41 as displayed images and, if necessary, the speakers 42 as sounds corresponding to the images. To put it concretely, as described earlier, the information indicating the request for a start of a remote communication is queries asking the user X to accept or turn down the request.

Looking at pieces of information appearing on the display unit 41 as the information indicating the request for a start of a remote communication and the user-disclosure information of the user A, the user X operates the operation input section 31 to enter information indicating acceptance or rejection of the request. In turn, the operation input section 31 supplies an operation signal representing the acceptance or denial of the request for a start of a remote communication to the session control section 111.

In a process carried out at the next step S116, the session control section 111 examines an operation signal received from the operation input section 31 as the operation signal representing the acceptance or denial of the request for a start of a remote communication in order to produce a determination result as to whether the operation signal is an operation signal representing the acceptance or denial of the request. If the determination result indicates that the operation signal received from the operation input section 31 is an operation signal representing the acceptance of the request for a start of a remote communication, the flow of the processing goes on to a step S117 at which the session control section 111 controls the request-response sender section 124 to transmit a response signal to the communication apparatus 1-1 as a signal indicating the acceptance of the request. Then, the flow of the processing goes on to a step S118.

In a process carried out at the step S118, the session control section 111 controls the sender section 132 and the receiver section 133 to exchange connection signals with the communication apparatus 1-1 in order to establish a connection with the communication apparatus 1-1. Then, the session control section 111 updates the user-setting information stored in the user-information storage section 63 and, if necessary, the user-disclosure information in accordance with the updating of the user-setting information. Subsequently, the flow of the processing goes on to a step S119. In a process carried out at the step S119, the session control section 111 controls the transmission control section 112 to transmit the updated user-disclosure information to the session target members before terminating the remote-communication start processing.

Later on, the flow of the processing goes back to the step S2 included in the flowchart shown in FIG. 5 as a step following the step S1. In a process carried out at the step S1, the session control section 111 controls the input section 22 and the sender section 132 to start transmitting real-time data input by the input section 22 as real-time data of the users X and Y to the communication apparatus 1-1 by way of the communication network 2. In addition, the session control section 111 controls the receiver section 133 to start receiving real-time data transmitted by the communication apparatus 1-1 as real-time data of the user A.

Then, an image and voice included in the real-time data of the user A as well as an image and voice included in the real-time data of the user P are supplied to the audio/video synthesis section 26. Subsequently, in accordance with control executed by the synthesis control section 84, the audio/video synthesis section 26 synthesizes the image and voice included in the real-time data of the user A as well as an image and voice included in the real-time data of the user P with the image and sound of the content to output video and audio signals as a synthesis result to the output section 21. Thus, the display unit 41 employed in the communication apparatus 1-2 shows an image appearing on the display unit 41 shown in FIG. 10 as the image of the BS1 1ch content being reproduced and a subscreen superposed on the image as a subscreen showing an image included in the real-time data of the user A as the image of the user A and an image included in the real-time data of the user P as the image of the user P in a process to start a remote communication.

If the determination result produced in the process carried out at the step S116 indicates that the operation signal received from the operation input section 31 is not an operation signal representing the acceptance of the request for a start of a remote communication, that is, the operation signal received from the operation input section 31 is an operation signal representing the denial of the request, on the other hand, the flow of the processing goes on to a step S120 at which the session control section 111 controls the request-response sender section 124 to transmit a response signal to the communication apparatus 1-1 as a signal indicating the denial of the request. Then, the flow of the processing goes back to the step S111 to repeat the processes of this step and the subsequent steps.

As described above, if the user X receives user-disclosure information of the user A even in the course of a remote communication with the user P serving as a session target member, the user X transmits user-disclosure information of its own to the user A serving as another session target member. Thus, the user A desiring a start of a remote communication with the user X is notified of information on the user X. As a result, the remote communication with the user X can be started with a light heart instead of being merely turned down one-sidedly.

In addition, by carrying out the remote-communication start processing represented by the flowchart shown in FIG. 15 also in the communication apparatus 1-3 to start a remote communication with the communication apparatus 1-1, the communication apparatus 1-1 is also capable of starting the remote communication with the communication apparatus 1-3. Since the communication apparatus 1-1 allows remote communications with the communication apparatus 1-2 and 1-3 to be carried out, the communication apparatus 1-1 is allowed to participate in a remote communication between the communication apparatus 1-2 and 1-3.

As described above, a user who did not utilize its communication apparatus when a remote communication of a session target member was started is also capable of participating in the remote communication being executed by the session target member with a light heart even in the course of execution of the remote communication.

In accordance with the present invention, as described above, remote-communication processing can be carried out. Thus, more lively and natural communications can be implemented in comparison with equipment including the conventional telephone set, the TV telephone set and remote communication apparatus such as the video conference system.

That is to say, in the case of the conventional communication, the user X using a conventional TV set to view and listen to a broadcast content distributed in a real-time manner utilizes an audio telephone set to express an impression of the broadcast content viewed and listened to by the user X to the user A present at a remote location. In this case, nevertheless, it is difficult for the user A, who does not actually view and listen to the broadcast content, to understand the impression of the situation.

By using the communication apparatus according to an embodiment of the present invention, however, the users A and X present at locations remote from each other are capable of sharing the content at the same time and, in addition, the images of the users A and X can be reproduced on subscreens or the like while their voices can be heard. Thus, in spite of the fact that the users A and X are present at locations remote from each other, it is possible to provide a high realistic sensation, a sense of togetherness and a sense of intimacy as if a face-to-face communication were being carried out.

In addition, when a remote communication is started, pieces of user-disclosure information generated for session target members as pieces of user-disclosure information that can be disclosed to each other session target member are exchanged so that a remote communication exchanging images and voices between communication participants can be carried out only after the exchanged pieces of user-disclosure information have been referred to. Thus, since a communication participant knows the condition or communication state of a communication partner, requests and responses can be exchanged with a light heart and a remote communication can be started smoothly in comparison with a communication system allowing a one-sided request to be made as is the case with, for example, the conventional telephone system adopting the calling method. As a result, more lively and natural communications can be implemented.

User-disclosure information is exchanged even after a 1-to-1 remote communication is started. Thus, in accordance with setting of session target members each serving as a candidate for a partner of a remote communication, any of the session target members each serving as a candidate for a partner of a remote communication is capable of participating in the remote communication instead of limiting the remote communication to a 1-to-1 connection. Thus, a more lively and natural space of sharing a content can be created.

Furthermore, in the course of a remote communication, the setting of session target members can be managed by including attributes and private levels in the user-setting information. Thus, a communication candidate suitable for the present condition can be selected.

As described above, more lively remote communications can be implemented. Thus, popularization of the remote communication can be promoted.

The series of processes carried out by the communication apparatus 1 as described previously can be carried out by hardware and/or execution of software. In this case, each of the communication apparatus 1-1 and 1-2 shown in FIG. 1 is typically implemented by a personal computer 401 like one shown in FIG. 16.

In the personal computer 401 shown in FIG. 16, a CPU (Central Processing Unit) 411 is a component for carrying out various kinds of processing by execution of a variety of programs stored in advance in a ROM (Read Only Memory) 412 or loaded into a RAM (Random Access Memory) 413 from a storage section 418. The RAM 413 is also used for properly storing data by the CPU 411 in the executions of the programs.

The CPU 411, the ROM 412, and the RAM 413 are connected to each other through a bus 414. The bus 414 is also connected to an input/output interface 415.

The input/output interface 415 is connected to an input section 416, an output section 417, the storage section 418 mentioned above, and a communication section 419. Used for receiving a command entered by the user, the input section 206 includes input devices such as a keyboard and a mouse, whereas the output section 207 includes a display unit for displaying an image and a speaker for outputting a generated sound. The display unit is typically a CRT (Cathode Ray Tube) display unit or an LCD (Liquid Crystal Display) unit. The storage section 418 is typically a hard-disk drive including an embedded hard disk used for storing a variety of programs and various kinds of data. The communication section 419 including a modem and a terminal adapter is a unit for carrying out radio or wire communication processing with other apparatus through a network.

The input/output interface 415 is also connected to a drive 420 on which a recording medium is mounted. Examples of the recording medium are a magnetic disk 421, an optical disk 422, a magneto-optical disk 423, and a semiconductor memory 424. If necessary, a program read out from the recording medium is installed in the storage section 418.

As explained above, the series of processes carried out by the communication apparatus 1 as described previously can be carried out by hardware and/or execution of software. If the series of processes described above is carried out by execution of software, programs composing the software can be installed into a computer embedded in dedicated hardware, a general-purpose personal computer, or the like from typically a network or the recording medium described above. By installing a variety of programs into the general-purpose personal computer, the personal computer is capable of carrying out a variety of functions.

As explained above, if necessary, a program read out from the recording medium as the software mentioned above is installed in the storage section 418. The recording medium itself is distributed to users separately from the main unit of the communication apparatus 1. As shown in FIG. 16, examples of the recording medium also referred to as package media are magnetic disks 421 including a flexible disk, optical disks 422 including a CD-ROM (Compact Disk-Read Only Memory) and a DVD (Digital Versatile Disk), magneto-optical disks 423 including an MD (Mini Disk [trademark]) and a semiconductor memory 424. As an alternative to installation of a program from the package media into the storage section 418, the program can also be stored in advance typically in the ROM 412 or a hard disk embedded in the storage section 418.

It is worth noting that, in this specification, steps of any program represented by a flowchart described above can be carried out not only in a pre-prescribed order along the time axis, but also concurrently or individually.

It is also to be noted that the technical term 'system' used in this specification implies the configuration including a plurality of apparatus.

In addition, it should be understood by those skilled in the art that various modifications, combinations, sub-combinations, and alterations may occur in dependence on design requirements and other factors insofar as they are within the scope of the appended claims or the equivalents thereof.

What is claimed is:

1. An information-processing apparatus operated by a user to carry out communications through a network, said information-processing apparatus comprising:
    means for transmitting user-disclosure information to an other information-processing apparatus, said user-disclosure information including a number of other users utilizing said information-processing apparatus;
    means for receiving other user-disclosure information from the other information-processing apparatus;
    means for controlling a process to display said other user-disclosure information received by said means for receiving;
    means for requesting a connection to said other information-processing apparatus in accordance with a received user operation;
    means for producing a determination result indicating that said connection requested by said means for requesting to said other information-processing apparatus is authorized or not authorized by said other information-processing apparatus based on a response received from said other information-processing apparatus based on said transmitted user-disclosure information;
    means for transmitting image and voice data of said user to said other information-processing apparatus and receiving image and voice data of an other user from said other information-processing apparatus in case said determination result produced by said means for producing said determination result indicates that said connection with said other information-processing apparatus is authorized by said other information-processing apparatus; and
    means for synthesizing a display image based on image and voice data received from said other information-processing apparatus and a content.

2. The information-processing apparatus according to claim 1, wherein said means for synthesizing a display image synthesizes said display image based on at least one of said user-disclosure information and said other user-disclosure information.

3. The information-processing apparatus according to claim 2, wherein said user-disclosure information and said other user-disclosure information include information corresponding to a posture of a user and a voice of a user.

4. An information-processing method for carrying out communications through a network, said method comprising:
    transmitting user-disclosure information from an information-processing apparatus to an other information-processing apparatus, said user-disclosure information including a number of other users utilizing said information-processing apparatus;
    receiving user-disclosure information from said other information-processing apparatus;
    controlling a process to display said other user-disclosure information received in said receiving;
    requesting, using a processor, a connection to said other information-processing apparatus in accordance with a received user operation;
    producing a determination result indicating that said connection requested in said requesting to said other information-processing apparatus is authorized or not authorized by said other information-processing apparatus based on a response received from said other information-processing apparatus based on said transmitted user-disclosure information;
    transmitting image and voice data of said user to said other information-processing apparatus and receiving image and voice data of an other user from said other information-processing apparatus in case said determination result produced in said producing indicates that said connection with said other information-processing apparatus is authorized by said other information-processing apparatus; and
    synthesizing a display image based on image and voice data received from said other information-processing apparatus and a content.

5. The information-processing method according to claim 4, wherein said synthesizing a display image includes synthesizing said display image based on at least one of said user-disclosure information and said other user-disclosure information.

6. The information-processing apparatus according to claim 5, wherein said user-disclosure information and said other user-disclosure information include information corresponding to a posture of a user and a voice of a user.

7. A computer readable storage medium encoded with a computer readable program configured to cause an information processing apparatus to execute a method, the method comprising:

transmitting user-disclosure information from an information-processing apparatus to an other information-processing apparatus, said user-disclosure information including a number of other users utilizing said information-processing apparatus;

receiving user-disclosure information from said other information-processing apparatus;

controlling a process to display said other user-disclosure information received in said receiving;

requesting, using a processor, a connection to said other information-processing apparatus in accordance with a received user operation;

producing a determination result indicating that said connection requested in said requesting to said other information-processing apparatus is authorized or not authorized by said other information-processing apparatus based on a response received from said other information-processing apparatus based on said transmitted user-disclosure information;

transmitting image and voice data of said user to said other information-processing apparatus and receiving image and voice data of an other user from said other information-processing apparatus in case said determination result produced in said producing indicates that said connection with said other information-processing apparatus is authorized by said other information-processing apparatus;

synthesizing a display image based on image and voice data received from said other information-processing apparatus and a content.

8. The computer readable medium according to claim 7, said synthesizing a display image includes synthesizing said display image based on at least one of said user-disclosure information and said other user-disclosure information.

9. The information-processing apparatus according to claim 8, wherein said user-disclosure information and said other user-disclosure information include information corresponding to a posture of a user and a voice of a user.

10. An information-processing apparatus operated by a user to carry out communications through a network, said information-processing apparatus comprising:

a disclosure-information sender section configured to transmit user-disclosure information to an other information-processing apparatus using a processor and a network controller, said user-disclosure information including a number of other users utilizing said information-processing apparatus;

a disclosure-information receiver section configured to receive user-disclosure information from said other information-processing apparatus using said processor and said network adapter;

a display control section configured to control a process to display said other user-disclosure information received by said disclosure-information receiver section on a display unit;

a connection request section configured to request a connection to said other information-processing apparatus in accordance with a received user operation;

a connection-permission determination section configured to produce a determination result indicating that said connection requested by said connection request section to said other information-processing apparatus is authorized or not authorized by said other information-processing apparatus based on a response received from said other information-processing apparatus based on said transmitted user-disclosure information;

a communication section configured to transmit image and voice data of said user to said other information-processing apparatus and receive image and voice data of an other user from said other information-processing apparatus in case said determination result produced by said connection-permission determination section indicates that said connection with said other information-processing apparatus is authorized by said other information-processing apparatus; and a synthesizing section configured to synthesize, using said processor, a display image based on image and voice data received from said other information-processing apparatus and a content.

11. The information-processing apparatus according to claim 10, wherein said user-disclosure information includes any acquirable information on content being viewed on said information-processing apparatus, a voice or an image of said user, information on an environment surrounding said user, and a status of a connection through said network.

12. The information-processing apparatus according to claim 11, wherein said information on the environment surrounding the user includes an image of a location of the user, a brightness of the location of the user, and a temperature of the location of the user.

13. The information-processing apparatus according to claim 11, wherein said user-disclosure information includes a status information indicating an activity being performed by the user.

14. The information-processing apparatus according to claim 10, wherein said disclosure-information unit is further configured to transmit said user-disclosure information to said other information-processing apparatus at least one of periodically and when said disclosure-information receiver section receives said other user-disclosure information from said other information-processing apparatus.

15. The information-processing apparatus according to claim 10, further comprising:

a synchronous reproduction unit configured to reproduce content data having a same substance as content data being reproduced by said other information-processing apparatus, the reproduction being synchronized with reproduction of said content data in said other information-processing apparatus; and a synthesis unit configured to synthesize a sound and image of content data synchronously reproduced by said synchronous reproduction unit with said voice and image data received by said communication section as a voice and image of said other user.

16. The information-processing apparatus according to claim 10, wherein said user-disclosure information includes a preferred type of user communication indicating the user prefers one of voice and image communication, voice only communication, and image only communication.

17. The information-processing apparatus according to claim 10, wherein said user-disclosure information includes information on a state of a remote communication including a picture of a different user presently communicating with the user.

18. The information-processing apparatus according to claim 10, wherein the number of other users utilizing said other information-processing apparatus includes a number of users observing content on the other information-processing apparatus simultaneously to the user observing the content on the information-processing apparatus.

19. The information-processing apparatus according to claim 10, wherein said synthesizing section is configured to synthesize said display image based on at least one of said user-disclosure information and said other user-disclosure information.

20. The information-processing apparatus according to claim 19, wherein said user-disclosure information and said other user-disclosure information include information corresponding to a posture of a user and a voice of a user.

* * * * *